United States Patent
Yeung et al.

(10) Patent No.: US 11,475,194 B1
(45) Date of Patent: Oct. 18, 2022

(54) MULTI-PVT FREQUENCY PREDICTION (MULTI-PVT FP) FOR STATICALLY TIMED DESIGNS THROUGH STATISTICAL REGRESSION

(71) Applicant: Apex Semiconductor

(72) Inventors: Alfred Yeung, San Jose, CA (US); Minkyu Kim, San Jose, CA (US); Suresh Subramaniam, San Jose, CA (US); Pravin Chingudi, Karnataka (IN)

(73) Assignee: Apex Semiconductor, San Jose, CA (US)

( * ) Notice: Subject to any disclaimer, the term of this patent is extended or adjusted under 35 U.S.C. 154(b) by 336 days.

(21) Appl. No.: 16/778,537

(22) Filed: Jan. 31, 2020

(51) Int. Cl.
*G06F 30/3315* (2020.01)
*G06F 30/3308* (2020.01)
*G06F 119/12* (2020.01)

(52) U.S. Cl.
CPC ...... *G06F 30/3315* (2020.01); *G06F 30/3308* (2020.01); *G06F 2119/12* (2020.01)

(58) Field of Classification Search
CPC ............. G06F 30/3315; G06F 30/3308; G06F 2119/12
See application file for complete search history.

(56) References Cited

U.S. PATENT DOCUMENTS

| | | |
|---|---|---|
| 8,243,759 B2 | 8/2012 | Rahbar |
| 9,183,333 B2 | 11/2015 | Shebaita |
| 9,245,071 B2 | 1/2016 | Katz et al. |
| 9,405,882 B1 | 8/2016 | Dhuria et al. |
| 9,483,597 B1 | 11/2016 | Das et al. |
| 9,875,333 B1 | 1/2018 | Verma et al. |
| 10,318,676 B2 | 6/2019 | Yeung et al. |
| 10,346,569 B2* | 7/2019 | Allen .................. G06F 30/3312 |
| 2012/0284680 A1* | 11/2012 | Iyer ..................... G06F 30/3312 716/113 |
| 2015/0370955 A1 | 12/2015 | Ahlen |

(Continued)

OTHER PUBLICATIONS

"Unobserved Corner" Prediction: reducing Timing Analysis Effort for Faster Design Convergence in Advanced-Node Design, by Andrew B. Kahng, Uday Mallappa, Lawrence Saul, and Shangyuan Tong, 2019 EDAA.*

*Primary Examiner* — Nha T Nguyen
(74) *Attorney, Agent, or Firm* — Amin, Turocy & Watson, LLP

(57) ABSTRACT

Techniques improve integrated circuit design by employing multi-operating condition frequency prediction for statically timed designs through statistical analysis. A design management component (DMC) can determine a trained model representing timing path properties and operating conditions of agnostic timing paths based on an analysis of vectorized data that represents timing path information associated with the agnostic timing paths. DMC can perform statistical regression on the vectorized data to facilitate training the trained model. A static timing analysis (STA) component can perform STA on design information associated with the integrated circuitry design and determine an operating condition of a timing path of the integrated circuitry design based on the STA. DMC can predict or determine at least one other operating condition associated with the integrated circuitry design based on the operating condition and the trained model.

22 Claims, 12 Drawing Sheets

(56) References Cited

U.S. PATENT DOCUMENTS

| | | |
|---|---|---|
| 2017/0046469 A1 | 2/2017 | Rao et al. |
| 2019/0228126 A1* | 7/2019 | Oh ................. G06F 30/327 |
| 2020/0074276 A1* | 3/2020 | Cooke ............... G06F 30/27 |
| 2020/0151294 A1* | 5/2020 | Kim ............... G01R 31/2872 |
| 2021/0056468 A1* | 2/2021 | Cao ................. G06N 5/003 |
| 2021/0117193 A1* | 4/2021 | Kim ................ G06F 9/3879 |
| 2021/0173993 A1* | 6/2021 | Raman ............... G06N 3/08 |
| 2022/0028478 A1* | 1/2022 | Park ................ G11C 7/1057 |
| 2022/0050946 A1* | 2/2022 | Lee .................. G06F 30/39 |

* cited by examiner

MULTI-PVT FREQUENCY PREDICTION (MULTI-PVT FP) FOR STATICALLY TIMED DESIGNS THROUGH STATISTICAL REGRESSION

TECHNICAL FIELD

The subject disclosure relates generally to integrated circuit design, e.g., to techniques for multi-operating condition frequency prediction for statically timed designs through statistical analysis.

BACKGROUND

High-performance integrated circuits traditionally have been characterized by the clock frequency at which they operate. Measuring the ability of a circuit to operate at the specified speed can involve an ability to measure, during the design process, its delay at numerous points. It can be desirable to incorporate the delay calculation into the inner loop of timing optimizers at various phases of the circuit design, such as logic synthesis, layout (e.g., placement and routing of circuit components or elements), and in-place optimizations performed late in the design cycle. While such timing measurements can theoretically be performed using a rigorous circuit simulation, such an approach can be too slow to be practical or useful. One type of circuit simulation that can be employed can be spice simulation.

Another type of circuit analysis, static timing analysis (STA), also can play a useful role in facilitating fast and reasonably accurate measurement of circuit timing of a circuit. The speedup can come from the use of simplified timing models and by largely ignoring logical interactions in the circuit. STA has become a mainstay of circuit design over the last few decades. However, due to increasing complexity of the circuit design process in more recent integrated circuit designs, there can be drawbacks and inefficiencies to using STA to analyze or test integrated circuit designs as well.

The above-described description is merely intended to provide a contextual overview of traditional methods associated with integrated circuit design and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an effort to overcome these and/or other deficiencies, in an example embodiment, disclosed herein is a system for determining timing path frequency associated with an integrated circuitry design. The system comprises a design management component that determines a trained model that models timing path properties and operating conditions of a set of agnostic timing paths based at least in part on an analysis of vectorized data that represents timing path information associated with the set of agnostic timing paths. The system also comprises a static timing analysis component that performs a static timing analysis on design information associated with the integrated circuitry design and determines an operating condition of a timing path of the integrated circuitry design based at least in part on the static timing analysis, wherein the design management component determines at least one other operating condition associated with the integrated circuitry design based at least in part on the operating condition and the trained model that models the timing path properties and the operating conditions of the set of agnostic timing paths.

In another example embodiment, disclosed herein is a method for determining timing path frequency associated with an integrated circuitry design. The method involves determining, by a system comprising a processor, a trained model that represents timing path properties and operating conditions of a set of sample timing paths based at least in part on an analysis of vectorized information determined from timing path information associated with the set of sample timing paths. The method also can comprise determining, by the system, an operating condition of a timing path of the integrated circuitry design based at least in part on a static timing analysis performed on design data associated with the integrated circuitry design. The method further can comprise determining, by the system, at least one other operating condition associated with the integrated circuitry design based at least in part on the operating condition and the trained model that represents the timing path properties and the operating conditions of the set of sample timing paths.

In yet another example embodiment, disclosed herein is a machine-readable storage medium, comprising executable instructions that, when executed by a processor, facilitate performance of operations. The operations can comprise generating a trained model that represents timing path properties and operating conditions of a set of sample timing paths based at least in part on an analysis of vectorized data determined from timing path information associated with the set of sample timing paths. The operations also can include determining an operating condition of a timing path of a design of integrated circuitry based at least in part on a static timing analysis performed on design data associated with the design of the integrated circuitry. The operations further can comprise predicting at least one other operating condition associated with the design of the integrated circuitry based at least in part on the operating condition and the trained model that represents the timing path properties and the operating conditions of the set of sample timing paths.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
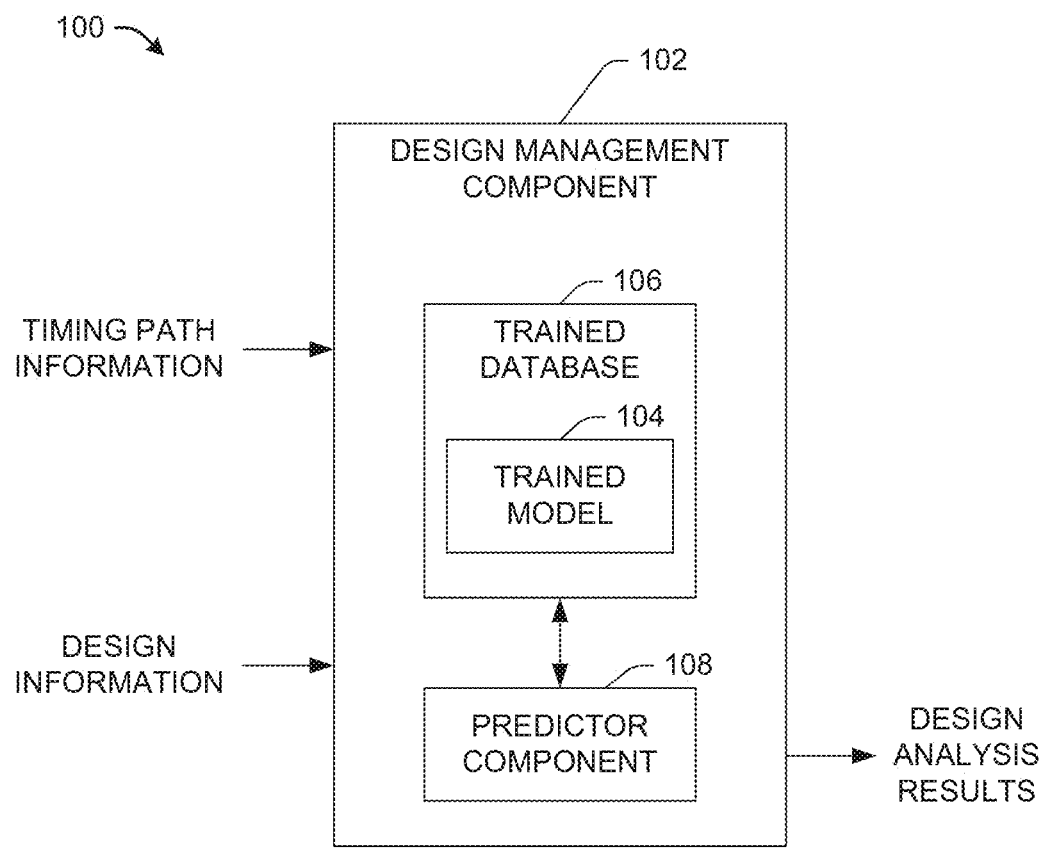
FIG. 1 illustrates a block diagram of an example, non-limiting system that can efficiently enhance a design of a circuit (e.g., an integrated circuit) by employing multi-operating condition frequency prediction for statically timed designs through statistical analysis, in accordance with various aspects and embodiments of the disclosed subject matter.

The disclosure herein is described with reference to the drawings, wherein like reference numerals are used to refer to like elements throughout. In the following description, for purposes of explanation, numerous specific details are set forth in order to provide a thorough understanding of the disclosed subject matter. It may be evident, however, that various disclosed aspects can be practiced without these specific details. In other instances, well-known structures and devices are shown in block diagram form in order to facilitate describing the disclosed subject matter.

High-performance integrated circuits traditionally have been characterized by the clock frequency at which they operate. Measuring the ability of a circuit to operate at the specified speed can involve an ability to measure, during the design process, its delay at numerous points. It can be desirable to incorporate the delay calculation into the inner loop of timing optimizers at various phases of the circuit design, such as logic synthesis, layout (e.g., placement and routing of circuit components or elements), and in-place optimizations performed late in the design cycle. While such timing measurements can theoretically be performed using a rigorous circuit simulation, such an approach can be too slow to be practical or useful.

Static timing analysis (STA) also can play a useful role in facilitating fast and reasonably accurate measurement of circuit timing of a circuit. The speedup can come from the use of simplified timing models and by largely ignoring logical interactions in the circuit. STA has become a mainstay of circuit design over the last few decades.

However, due to increasing complexity of the circuit design process in more recent integrated circuit designs, statistical STA has been a de facto technique used for timing analysis of circuit designs. Issues related to recent process technology in the case of STA can include, for example, statistical STA can utilize a undesirably and significantly higher amount of timing model characterization to characterize a circuit design, and it can be desirable to analyze many more operating corners for a circuit design to be desirably (e.g., completely or substantially completely) analyzed.

Both of these issues can lead to undesirably longer turnaround time and more resource (e.g., computer resources, time resources, . . . ) commitment, which can result in STA losing its speedup value. Further, there can be significant issues that may not be addressed in STA. Such significant issues can include, for example, each operating condition associated with a circuit design can involve its own timing model characterization, wherein, without it, that corresponding operating condition can end up not being analyzed and potentially can leave a significant design coverage issue. Also, an analysis across all or at least substantially all operating conditions usually can be reserved for very late in the design cycle of the circuit design. While optimization typically can occur in a few dominant analysis conditions, there still can be design targets for all or substantially all operating conditions. Since they may not be analyzed until the end of the design cycle, there typically may not be any room (e.g., time or resources) for design optimization outside of the dominant analysis conditions.

To that end, presented are techniques that can improve integrated circuit design by employing multi-operating condition frequency prediction for statically timed designs through statistical analysis. In some embodiments, a design management component (DMC) can determine a trained model that can represent timing path properties and operating conditions of a set of agnostic timing paths (e.g., sample or exemplary timing paths) based at least in part on an analysis of vectorized data that can represent timing path information associated with the set of agnostic timing paths.

In certain embodiments, the DMC can perform a desired analysis on the vectorized data to facilitate determining and/or training the trained model. For example, the DMC can perform the desired analysis on the vectorized data using a desired training algorithm that can relate to statistical regression analysis, neural networks, or other desired machine learning techniques. A static timing analysis (STA) component can perform STA on design information associated with the integrated circuitry design and can determine an operating condition of a timing path of the integrated circuitry design based at least in part on the results of the STA on the design information. The DMC can predict or determine at least one other operating condition associated with the integrated circuitry design based at least in part on the operating condition and the trained model that can represent the timing path properties and the operating conditions of the set of agnostic timing paths.

These and other aspects and implementations of the disclosed subject matter will now be described in connection with the figures.

FIG. 1 illustrates a block diagram of an example, non-limiting system 100 that can efficiently enhance a design of a circuit (e.g., an integrated circuit) by employing multi-operating condition frequency prediction for statically timed designs through statistical analysis, in accordance with various aspects and embodiments of the disclosed subject matter. The system 100 and techniques disclosed herein can be employed, for example, with very-large-scale integration (VLSI) processes to efficiently design and create integrated circuits.

The system 100 can comprise a design management component (DMC) 102 that can be employed to perform design enhancement (e.g., improvement or optimization) to facilitate improving the design of an integrated circuit, which can comprise cells and timing paths, in accordance with various aspects and embodiments of the disclosed subject matter. For instance, the DMC 102 can employ various techniques for multi-operating condition frequency prediction for statically timed designs through statistical analysis (e.g., statistical regression analysis, neural networks, or other desired machine learning analysis, techniques, and/or algorithms) to enhance designing of integrated circuits.

In connection with designing an integrated circuit, various types of cells can be employed to perform various functions of the integrated circuit, wherein respective cells and respective timing paths can have respective properties (e.g., physical or logical properties (e.g., characteristics or attributes)). A cell(s) can be, can comprise, or can be part of electronic elements of an integrated circuit, wherein the electronic elements can comprise, for example, logic gates (e.g., AND gate, NAND gate, OR gate, NOR gate, XOR gate, XNOR gate, inverter gate, AND-OR-Invert gate, or other type of gate), multiplexer (MUX), demultiplexer (DEMUX), an adder component, a storage element (e.g., a flip-flop or latch element), etc. There also can be different types (e.g., variations) of a particular type of logic gate (e.g., a NAND gate can be a NAND-2 gate, which can have two inputs, or a NAND-3 gate which can have three inputs, . . . ) Further, various types of technologies (e.g., metal-oxide-semiconductor field-effect transistor (MOSFET) (also known as metal-oxide-silicon (MOS) transistor), complementary metal-oxide-semiconductor (CMOS), low voltage CMOS (LVCMOS), p-type MOS (PMOS), n-type MOS (NMOS), or fin field-effect transistor (finFET), . . . ) can be employed with regard to the cells and/or logic gates.

The DMC 102 can receive respective timing path information regarding respective sample timing paths of a set of sample timing paths (e.g., agnostic, generic, or exemplary timing paths) from a desired source, such as, for example, a user (e.g., via a user interface associated with the DMC 102) or a component or device (not shown in FIG. 1) associated with (e.g., communicatively connected to) the DMC 102. The sample timing paths can be the types of timing paths that can be expected to be implemented in an integrated circuit design. For instance, the sample timing paths can be the types of timing paths that can be expected to be associated with electronic elements (e.g., electronic elements or other integrated circuit components, such as logic gates) in an integrated circuit design. Timing paths can have a starting point and an end point(s) that typically can be associated with respective electronic elements (e.g., respective ports or pins of respective electronic elements) of the integrated circuit design. An integrated circuit design can comprise various types of timing paths, such as, for example, data paths, clock paths, clock gating paths, or asynchronous paths, or other desired types of timing paths.

The DMC 102 also can receive design information associated with (e.g., relating to, representative of) integrated circuitry of an integrated circuit design, or portion thereof, that can be under consideration or design. In some embodiments, initially, the design information received by the DMC 102 (e.g., in an early stage of the designing of the integrated circuit) can comprise design information associated with a timing path of the integrated circuit design (or preliminary or draft design of the integrated circuit), or a relatively small number of timing paths of the integrated circuit design. As more fully described herein, in certain embodiments, the DMC 102 also can receive design information (e.g., other design information) associated with other timing paths of the integrated circuit design at a desired time(s) during the design of the integrated circuit. The DMC 102 can receive the design information from a desired source, such as, for example, a user (e.g., via the user interface) or a component or device (not shown in FIG. 1) associated with the DMC 102.

The DMC 102 can determine, generate (e.g., create), or train a trained model 104 that can represent (e.g., model) timing path properties and operating conditions of the set of sample timing paths based at least in part on an analysis of vectorized data. The DMC 102 can determine the vectorized data based at least in part on (e.g., relate to or represent) the respective timing path information (e.g., respective items of timing path information) associated with the respective sample timing paths of the set of sample timing paths, as more fully described herein. The DMC 102 can store the trained model 104, including the model data representative of the trained model 104, in a trained database 106. The DMC 102 can perform various processes (e.g., simulation process on the timing path information; abstraction process, filtering process, and vectorization process on simulation data produced from the simulation process; normalization process on the vectorized data; . . . ) to facilitate determining, generating, or training the trained model 104, in accordance with the defined design management criteria, as more fully described herein.

The DMC 102 can determine, generate, or train the trained model 104 and/or the trained database 106, or respective versions of the trained model and/or trained database, prior to an initial design of an integrated circuit design, or portion thereof (e.g., a timing path(s) of the integrated circuit design), or in conjunction with the initial design of the integrated circuit design, or portion thereof, as more fully described herein. The DMC 102 also can update (e.g., update the training of) the trained model 104 and/or trained database 106 during the analysis and design of the integrated circuit design or subsequent to the design of the integrated circuit design, as desired, as more fully described herein.

The DMC 102 (e.g., employing an STA component (not shown in FIG. 1)) can perform an STA on the design information associated with the integrated circuit design (e.g., the design information relating to the timing path of the integrated circuit design). At least initially, the DMC 102 can determine, for example, an operating condition of the timing path of the integrated circuit design based at least in part on the results of the STA. In some embodiments, as desired, initially, the DMC can determine one or more operating conditions of one or more timing paths of the integrated circuit design based at least in part on the results of the STA.

The DMC 102 also can determine one or more other operating conditions associated with the integrated circuit design based at least in part on the operating condition of the timing path of the integrated circuit design and the trained model 104 that can represent the timing path properties and the operating conditions associated with the set of sample timing paths, in accordance with the defined design management criteria. For instance, the DMC 102 can vectorize the analysis timing path data (e.g., STA timing path data) associated with the timing path of the integrated circuit design to generate vectorized input data, as more fully described herein.

The DMC 102 can comprise a predictor component 108 that can receive the vectorized input data associated with the timing path of the integrated circuit design, and also can receive certain vectorized data associated with the set of sample timing paths from the trained model 104 of the trained database 106. The predictor component 108 can analyze the vectorized input data and the vectorized data. Based at least in part on the results of the analysis of the vectorized input data and the vectorized data, the predictor component 108 can predict the one or more other operating conditions associated with the integrated circuit design, in accordance with the defined design management criteria. The DMC 102 can determine the one or more other operating conditions associated with the integrated circuit design, based at least in part on the prediction of the one or more other operating conditions associated with the integrated circuit design made by the predictor component 108, in accordance with the defined design management criteria. The DMC 102 can output information regarding the one or more other operating conditions associated with the integrated circuit design (e.g., determined or predicted design analysis results relating to the integrated circuit design), wherein the DMC 102, another component or device, and/or a user can use such output information regarding the one or more other operating conditions to design the integrated circuit, further design the integrated circuit, or modify the design of the integrated circuit.

Figure 2:
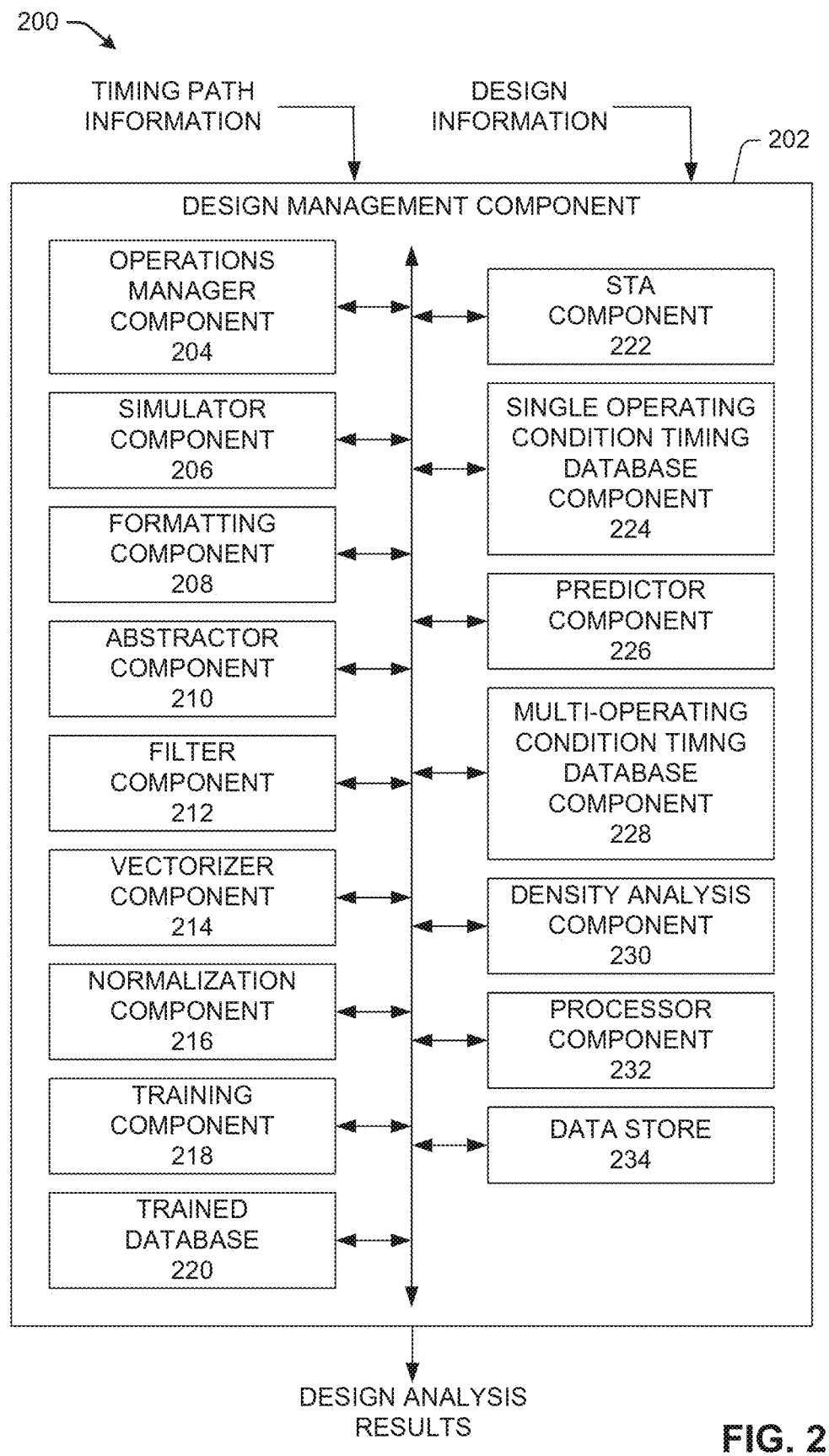
FIG. 2 depicts a block diagram of another example, non-limiting system that can efficiently enhance a design of a circuit (e.g., an integrated circuit) by employing multi-operating condition frequency prediction for statically timed designs through statistical analysis, in accordance with various aspects and embodiments of the disclosed subject matter.

Referring to FIG. 2, FIG. 2 depicts a block diagram of another example, non-limiting system 200 that can efficiently enhance a design of a circuit (e.g., an integrated circuit) by employing multi-operating condition frequency prediction for statically timed designs through statistical analysis, in accordance with various aspects and embodiments of the disclosed subject matter. The system 200 and techniques disclosed herein can be employed, for example, with VLSI processes to efficiently design and create integrated circuits.

The system 200 can comprise a DMC 202 that can efficiently manage the design of integrated circuit, including determining a desirable design of an integrated circuit, enhancements that can be made to an integrated circuit design, and/or determining operating conditions and properties associated with timing paths of an integrated circuit design, etc. The DMC 202 can comprise, for example, an operations manager component 204, a simulator component 206, a formatting component 208, an abstractor component 210, a filter component 212, a vectorizer component 214, a normalization component 216, a training component 218, a trained database 220, an STA component 222, a single operating condition (e.g., PVT) timing database 224, a predictor component 226, a multi-operating condition timing database 228, a density analysis component 230, a processor component 232, and a data store 234.

The operations manager component 204 can control or manage operations and/or algorithms being performed by various components of the DMC 202, controlling data flow between various components of the DMC 202, and/or controlling data flow between the DMC 202 and other components or devices (e.g., design database, communication network component, . . . ) associated with (e.g., connected to) the DMC 202, etc.

Figure 3:
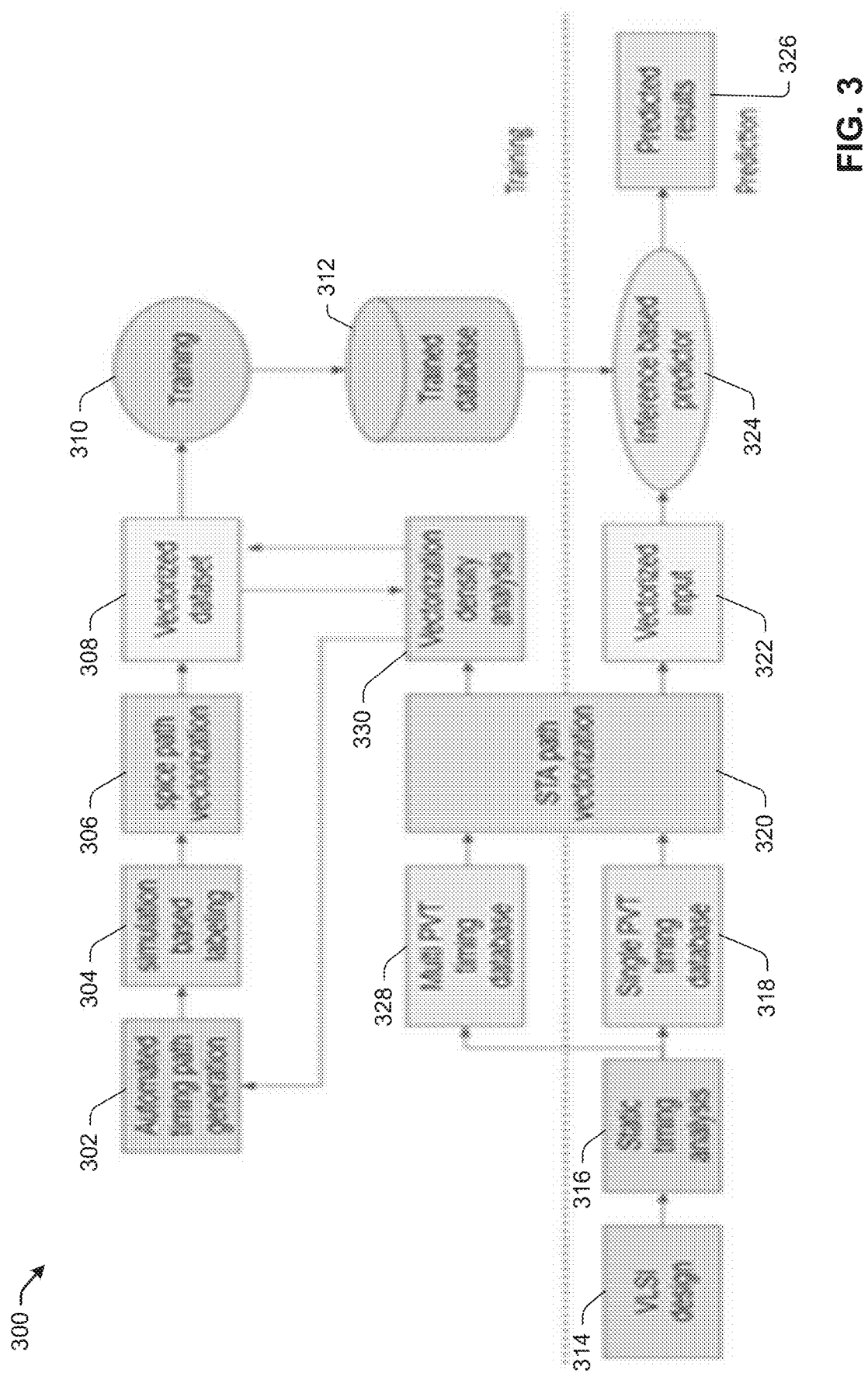
FIG. 3 presents a block diagram of an example timing path determination process flow that can be performed to determine or predict operating conditions of timing paths of an integrated circuit design, in accordance with various aspects and embodiments of the disclosed subject matter.

Referring to FIG. 3 (along with FIG. 2), FIG. 3 presents a block diagram of an example timing path determination process flow 300 that can be performed to determine or predict operating conditions of timing paths of an integrated circuit design, in accordance with various aspects and embodiments of the disclosed subject matter. The DMC 202 can receive respective items of timing path information relating to respective sample timing paths of a set of sample timing paths (e.g., agnostic, generic, or exemplary timing paths) from a desired source, such as, for example, a user (e.g., via a user interface associated with the DMC 202) or a component or device (not shown in FIG. 2) associated with (e.g., communicatively connected to) the DMC 202. The DMC 202 can perform automated timing path generation to facilitate determining or generating respective sample timing paths of the set of sample timing paths (as depicted at block 302 of the process flow 300 of FIG. 3). For instance, the DMC 202 can determine and/or generate the respective sample timing paths based at least in part on the results of analyzing the respective items of timing path information. The sample timing paths can be the types of timing paths that often can be expected to be implemented in an integrated circuit design, wherein the sample timing paths can be associated with electronic elements (e.g., electronic elements or other integrated circuit components, such as logic gates) in the integrated circuit design.

The simulator component 206 of the DMC 202 can perform a simulation based labeling process to facilitate simulating operation of the respective sample timing paths (as depicted at block 304 of the process flow 300). The simulator component 206 can analyze the respective sample timing paths and/or the respective items of timing path information associated with the respective sample timing paths. Based at least in part on the results of the analysis, the simulator component 206 can simulate the respective sample timing paths (e.g., simulate the operation, performance, and/or reactions or responses of the respective sample timing paths) to generate respective items of simulation data that can be associated with (e.g., can represent, correspond to, be indicative of) the simulation of the respective timing path properties and the respective operating conditions (e.g., PVT conditions, latencies, throughput conditions, and/or parasitic conditions, . . . ) associated with the respective sample timing paths. In some embodiments, the simulation performed by the simulator component 206 can be or can comprise, for example, a spice-based simulation of the respective sample timing paths based at least in part on the respective items of timing path information.

The DMC 202 can employ the formatting component 208, abstractor component 210, filter component 212, vectorizer component 214, and normalization component 216 to facilitate performing desired vectorization on the respective items of simulation data (as depicted at block 306 of the process flow 300), which can be produced as a result of the simulation of the respective sample timing paths, to generate a vectorized dataset (e.g., vectorized data) (as depicted at block 308 of the process flow 300), as more fully described herein. For instance, the formatting component 208 can format the respective items of simulation data into a desired format (e.g., database format) in a database to generate respective items of formatted simulation data. That is, the formatting component 208 can take the raw simulation results (e.g., items of simulation data) and parse such data into a desirable (e.g., suitable and/or relatively easy to digest) database (e.g., desired formatted database).

The abstractor component 210 can perform a desired abstraction process on the respective items of formatted simulation data to abstract the respective items of formatted simulation data associated with a higher number of unique timing path properties (e.g., 1,000,000 or other relatively higher number of unique timing path properties) to generate respective items of representative simulation data associated with a desired lower number of representative timing path properties associated with respective representative bins (e.g., 100 or other relatively lower number of representative timing path properties and associated representative bins), as more fully described herein. For instance, based at least in part on the supported logic families and technology associated with the integrated circuit design, the abstractor component 210 can abstract the gate based timing path properties from the relatively higher number of timing path properties into a relatively lower number of respective representative bins associated with respective representative timing path properties.

The filter component 212 can respectively filter, as desired, the respective items of representative simulation data, based at least in part on respective desired filters, to generate respective items of filtered data associated with the respective representative timing path properties (and associated representative bins), in accordance with the defined design management criteria relating to filtering of data. For example, the filter component 212 can respectively filter the respective items of representative simulation data (e.g., filter the values of such representative simulation data) to, with respect to particular items of representative simulation data associated with a particular representative bin, determine (e.g., calculate) the sum value of raw data values of such simulation data, determine the mean value of the raw data values, determine the mean plus N*sigma values of the raw data values, determine the average value of the raw data values, determine the root mean square value of the raw data values, filter out certain raw data values of certain items of the simulation data determined to be outlier data values, and/or perform other desired operations (e.g., mathematical operations) on the raw data values.

The vectorizer component 214 can perform a vectorization transformation on the filtered database in abstracted form so there can be deterministic fields for each representative bin, wherein each representative bin can be associated with one or more fields (e.g., a relatively low number of fields, as compared to the number of unique properties), as more fully described herein. For instance, based at least in part on the respective items of filtered data associated with the respective representative timing path properties (and associated representative bins), the vectorizer component 214 can vectorize (e.g., perform a vectorization transformation on) the respective items of filtered data to determine and generate respective items of the vectorized data that can represent the respective items of filtered data in a desired numeric form (e.g., as numeric vectors), wherein, with respect to each representative bin, respective items of vectorized data for such bin can be associated with respective fields of that representative bin.

In some embodiments, the normalization component 216 can normalize the respective items of vectorized data, in accordance with the defined design management criteria. For instance, the normalization component 216 can normalize the respective items of vectorized data to suppress (e.g., modify vectorized data to suppress) or remove any items of vectorized data that are determined by the normalization component 216 as outlier data relative to other items of vectorized data.

The training component 218 can utilize the items of vectorized data to perform training with regard to operating conditions and properties of timing paths to generate the trained database 220 (as indicated by blocks 310 and 312 of the process flow 300). For instance, the training component 218 can utilize the items of vectorized data to determine, generate (e.g., create), or train the trained database 220 based at least in part on a desired training algorithm and/or data analysis, in accordance with the defined design management criteria relating to database training. The trained database 220 can be or can comprise a trained model that can model the timing paths (e.g., sample timing paths), including modeling the respective properties and operating conditions of the timing paths. In some embodiments, to perform the training and generate the trained database 220, the training component 218 can utilize (e.g., apply) statistical regression analysis on a portion of the vectorized data (e.g., a training set) and validate the analysis results using another portion of the vectorized data (e.g., a validation set), as more fully described herein. In other embodiments, additionally or alternatively, the training component can perform desired analysis on the items of vectorized data using one or more desired neural network or other machine learning techniques and algorithms to perform the training and generate the trained database 220. The trained database 220 can comprise numerical values (e.g., vectors comprising numeric values) relating to operating conditions and properties of timing paths (e.g., sample timing paths) that can be desirable (e.g., suitable, acceptable, or optimal) for use by the DMC 202 in inferring or determining operating conditions and properties of timing paths of the integrated circuit design.

With regard to an integrated circuit design, or portion thereof, the STA component 222 can receive design information of the integrated circuit design (e.g., VLSI design) from a user (e.g., via an interface) or a component or device associated with the DMC 202 (as indicated at block 314 of the process flow 300). The design information can comprise information regarding one or more timing paths of the integrated circuit design, including components associated with the timing paths, and one or more properties and one or more operating conditions associated with the one or more timing paths. The STA component 222 can perform an STA on the design information (as indicated at block 316 of the process flow 300). In some embodiments, at least initially (e.g., relatively early on in the designing of the integrated circuit), the STA component 222 can determine an operating condition and/or property associated with a timing path of the integrated circuit design based at least in part the analysis results of the STA performed on the design information. The STA component 222 can store the information regarding the operating condition and/or property associated with the timing path of the integrated circuit design in a single operating condition (e.g., single PVT) timing database 224 in the data store 234 (as indicated at block 318 of the process flow 300). In certain embodiments, at the initial stage, the STA component 222 can determine more than one operating condition and/or more than one property associated with more than one timing path of the integrated circuit design based at least in part the analysis results of the STA performed on the design information.

The vectorizer component 214 can perform a vectorization transformation (e.g., STA path vectorization) on the analysis timing path information (e.g., STA results regarding the timing path) to convert the analysis timing path information into vectorized input data that can be or can comprise a desired vector, which can include a desired number of vector fields, wherein the vector can represent the analysis timing path information in numeric form (as indicated at blocks 320 and 322 of the process flow 300). The vectorization transformation performed by the vectorizer component 214 on the analysis timing path information can be the same as or similar to the vectorization transformation performed on the filtered data that can be determined based at least in part on the sample timing paths.

The predictor component 226 can receive (e.g., retrieve or obtain) the vectorized input data associated with the timing path of the integrated circuit design and also can receive the trained model from the trained database 220, wherein the predictor component 226 can be or can comprise an inference based predictor function (as indicated at block 324 of the process flow 300). The trained model can comprise model data that can be based at least in part on the training performed using the vectorized data. In some embodiments, the model data can be in the form of a numeric vector. The predictor component 226 can analyze the model data of the trained model and the vectorized input data using desired inference techniques, prediction techniques, and/or machine learning techniques (e.g., machine learning techniques relating to inference and/or prediction) and associated algorithms. From the analysis, the predictor component 226 can infer or predict one or more other operating conditions and/or other properties of one or more timing paths of the integrated circuit design based at least in part on the vectorized input data relating to the operating condition of the timing path of the integrated circuit design and the model data of the trained model, which can be based at least in part on the vectorized data relating to the set of timing paths (e.g., set of sample timing paths).

Based at least in part on the results of the analysis, the predictor component 226 can determine and generate predicted results (as indicated at block 326 of the process flow 300). The predicted results can comprise or relate to one or more other operating conditions and/or other properties of one or more timing paths of the integrated circuit design. The DMC 202 can determine the one or more other operating conditions and/or other properties of the one or more timing paths of the integrated circuit design based at least in part on the prediction results. That is, employing inference and prediction processes, the DMC 202 can determine the one or more other operating conditions and/or other properties of the one or more timing paths of the integrated circuit design based at least in part on the vectorized input data relating to the operating condition of the timing path of the integrated circuit design and the model data of the trained model, which can be based at least in part on the vectorized data relating to the set of timing paths (e.g., set of sample timing paths).

In accordance with various embodiments, the DMC 202, another component or device, or a user can determine or design desired timing paths, electronic elements, or other features of the integrated circuit design based at least in part on the one or more other operating conditions and/or other properties of the one or more timing paths of the integrated circuit design determined from the predicted results.

In some embodiments, at a desired point during the design process (e.g., a later point in the design process when the integrated circuit design is relatively close to being finished, or when the initial design is essentially finished and being validated), the DMC 202 can perform an STA on the integrated circuit design and can feed (e.g., communicate) the STA results relating to the timing paths and properties of the integrated circuit design to the training side of the system 200 for use by the training component 218 to facilitate validating the integrated circuit design and/or performing further training (e.g., update) of the trained database 220 (e.g., the trained model of the trained database 220) to enhance the trained database 220 and enhance the prediction results produced by the predictor component 226. For instance, the DMC 202 can store the STA results, comprising information regarding the operating conditions and properties of the timing paths of the integrated circuit design, in the multi-operating condition (e.g., multi-PVT) timing database 228 (as indicated at block 328 of the process flow 300).

The vectorizer component 214 can obtain the STA results relating to the operating conditions of the timing paths of the integrated circuit design from the multi-operating condition timing database 228. The vectorizer component 214 can vectorize the STA results to generate analysis (e.g., STA) vectorized data (as indicated at block 320 of the process flow 300) associated with the operating conditions and properties of the timing paths of the integrated circuit design in a same or similar manner as the vectorizer component 214 vectorized the earlier STA results relating to the operating condition (e.g., single operating condition) of the timing path (e.g., single timing path), which was stored in the single operating condition timing database 224.

In some embodiments, the density analysis component 230 can perform a vectorization density analysis on the analysis vectorized data associated with the operating conditions and properties of the timing paths of the integrated circuit design (as indicated by block 330 of the process flow 300), to facilitate determining whether any of the analysis vectorized data is overly and undesirably represented in the analysis vectorized data (e.g., whether any type of analysis vectorized data has an undesirably high density level, as compared to the density levels of other types of analysis vectorized data). For instance, the density analysis component 230 can analyze the analysis vectorized data associated with the operating conditions and properties of the timing paths of the integrated circuit design to facilitate determining the respective densities associated with respective items of analysis vectorized data (e.g., datapoints) that are associated with respective timing paths. Depending on the particular integrated circuit design, there may be a relatively high number of timing paths that are the same or are essentially the same, and thus, are associated with respective items of analysis vectorized data that are the same or essentially the same. In such cases, if all of these respective items of analysis vectorized data associated with such timing paths are added to the vectorized dataset used for training of the trained database 220, this can or potentially can undesirably skew or bias the vectorized dataset, which can undesirably skew or bias the determination or training of the trained database 220, such that these respective items of analysis vectorized data and associated timing paths can be overly and undesirably represented in the vectorized dataset and training of the trained database 220. If not accounted for and addressed, such an undesirable skew or bias can or potentially can result in the trained database 220 undesirably focusing more on the more dense datapoints (e.g., those respective items of analysis vectorized data associated with those timing paths) and less on other cases (e.g., other types of timing paths) involving other types of analysis vectorized data, which can result in the trained database 220 being less accurate with regarding to those other cases. The density analysis component 230 can identify, account for, and/or address such undesirable overrepresentation (e.g., oversaturating) of datapoints in the analysis vectorized data associated with the timing paths of the integrated circuit design.

For example, based at least in part on the analysis results, the density analysis component 230 can determine or identify the relative densities associated with the respective items of analysis vectorized data associated with the timing paths of the integrated circuit design, and can determine or identify whether there are certain types of items of analysis vectorized data of timing paths that have a relatively high density as compared to other types of items of analysis vectorized data of other timing paths. If the density analysis component 230 determines that the relative densities of respective types of items of analysis vectorized data of timing paths are sufficiently in line with each other, such that none of the types of items of analysis vectorized data are associated with a density level that is unacceptably higher than the density levels associated with other types of items of analysis vectorized data, based at least in part on a defined threshold density level (e.g., density level does not exceed or otherwise satisfy the defined threshold density level), the density analysis component 230 can determine that the items of analysis vectorized data of the timing paths of the integrated circuit design can be imported into the vectorized dataset without having to alter those items of analysis vectorized data.

If, instead, the density analysis component 230 determines that there is a certain type of items of analysis vectorized data of timing paths that has a relatively high density as compared to other types of items of analysis vectorized data of other timing paths, such that the certain type of items of analysis vectorized data exceeds or otherwise satisfies the defined threshold density level, the density analysis component 230 can modify (e.g., alter, adjust, or normalize) the items of analysis vectorized data to remove or suppress some of the items of analysis vectorized data of that certain type such that the density of the remaining items of analysis vectorized data of that certain type are not overly and undesirably represented in the analysis vectorized data, normalize items of analysis vectorized data such that the certain type of items of analysis vectorized data is not overly and undesirably represented in the analysis vectorized data relative to other types of items of analysis vectorized data, or otherwise modify the analysis vectorized data such that the certain type of items of analysis vectorized data is not overly and undesirably represented in the analysis vectorized data relative to other types of items of analysis vectorized data, in accordance with the defined design management criteria (e.g., in accordance with the defined threshold density level).

In such instances, the density analysis component 230 can provide (e.g., communicate) the modified analysis vectorized data to the vectorized dataset. The training component 218 can utilize the vectorized dataset, including the modified analysis vectorized data (or analysis vectorized data for which modification was not performed in accordance with the analysis results from the vectorization density analysis), to facilitate determining or training the trained database 220, including the trained model, as more fully described herein. By having the training component 218 determine or train the trained database 220 based at least in part on the modified analysis vectorized data along with the other vectorized data, the training of the trained database 220, including the trained model, can be enhanced (e.g., can be improved and/or made even more accurate) beyond the enhancements already incorporated into the trained database 220 in accordance with the disclosed subject matter, as more fully described herein. Such additional enhancements and training of the trained database 220 utilizing the modified (or unmodified, if and as appropriate) analysis vectorized data can enhance (e.g., improve and/or make more accurate) the prediction results rendered by the predictor component 226 and determinations made by the DMC 202 regarding a desirable (e.g., suitable or optimal) integrated circuit design, enhance the design of an integrated circuit under consideration (e.g., the current integrated circuit design associated with the modified (or unmodified) analysis vectorized data, or a future integrated circuit design). For instance, with regard to a current integrated circuit design under consideration, the additional training of the trained database 220 using the modified (or unmodified) analysis vectorized data can identify a timing path(s), electronic element(s), and/or cell(s) of the current integrated circuit design that can be modified to improve the design and performance of the current integrated circuit design, based at least in part on the prediction results provided by the predictor component 226 from an analysis of the trained database 220 (as additionally trained using the modified (or unmodified) analysis vectorized data).

In accordance with various embodiments, in addition to or as an alternative to the density analysis component 230 providing the modified (or unmodified) analysis vectorized data associated with the integrated circuit design to (e.g., directly to) the vectorized dataset, the density analysis component 230 can provide such modified (or unmodified) analysis vectorized data to the DMC 202 (in vectorized form or converted to an unvectorized form) to be included with timing path data associated with the sample timing paths. The DMC 202, employing the simulator component 206, can perform a simulation of the timing path data associated with the sample timing paths and the modified (or unmodified) analysis vectorized data (in vectorized on unvectorized form) associated with the timing paths of the integrated circuit design to simulate respective operating conditions of the respective sample timing paths and the respective timing paths of the integrated circuit design based at least in part on analysis and simulation of the timing path data and modified (or unmodified) analysis vectorized data. In accordance with the process flow 300, the DMC 202 can employ other desired processes on the simulation results (such as more fully described herein) to produce a vectorized dataset (e.g., an enhanced vectorized dataset) that can be utilized to enhance the training of the trained database 220, enhance the prediction results produced by the predictor component 226, and enhance the design of an integrated circuit.

The processor component 232 can operate in conjunction with the other components (e.g., operations manager component 204, simulator component 206, formatting component 208, abstractor component 210, and other components disclosed herein) to facilitate performing the various functions of the DMC 202, such as disclosed herein. The processor component 232 can employ one or more processors (e.g., central processing units (CPUs), graphical processing units (GPUs), field-programmable gate arrays (FPGAs)), microprocessors, or controllers that can process data, such as information (e.g., data, analog or digital information) relating to operations performed by the DMC 202, etc., to facilitate analyzing information relating to an integrated circuit design, generating STA data, generating simulation data, formatting data, abstracting data, filtering data, vectorizing data, performing statistical regression analysis on data, performing neural network or other machine learning processes on data, generating a trained model and trained database, performing inference on data, rendering predictions based on data, performing calculations on data, enhancing the integrated circuit design, executing algorithms (e.g., algorithms relating to the various processes, methods, and aspects described herein), and/or performing other operations; can control data flow between the DMC 202 and other components (e.g., data store or device comprising a design database, communication network component) associated with (e.g., connected to) the DMC 202; and can control data flow between the various components of the DMC 202.

In yet another aspect, the data store 234 can store data structures (e.g., voice information, data, metadata); code structure(s) (e.g., modules, objects, classes, procedures), commands, or instructions; information relating to analyzing information relating to an integrated circuit design, generating STA data, generating simulation data, formatting data, abstracting data, filtering data, vectorizing data, performing statistical regression analysis on data, performing neural network or other machine learning processes on data, generating a trained model and trained database, performing inference on data, rendering predictions based on data, performing calculations on data, enhancing the integrated circuit design, executing algorithms (e.g., algorithms relating to the various processes, methods, and aspects described herein), and/or performing other operations; parameter data; information relating to algorithms; and so on. In an aspect, the processor component 232 can be functionally coupled (e.g., through a memory bus) to the data store 234 in order to store and retrieve information desired to operate and/or confer functionality, at least in part, to the operations manager component 204, simulator component 206, formatting component 208, abstractor component 210, and other components disclosed herein, and/or substantially any other operational aspects of the DMC 202.

It is to be appreciated and understood that the various components of the DMC 202 can communicate information between each other and/or between other components associated with the DMC 202 as desired to carry out operations of the DMC 202. It is to be further appreciated and understood that respective components (e.g., operations manager component 204, simulator component 206, formatting component 208, abstractor component 210, and other components disclosed herein) of the DMC 202 each can be a stand-alone unit, can be included within the DMC 202 (as depicted), can be incorporated within another component of the DMC 202, or can be a component separate from the DMC 202, and/or virtually any suitable combination thereof, as desired.

Figure 4:
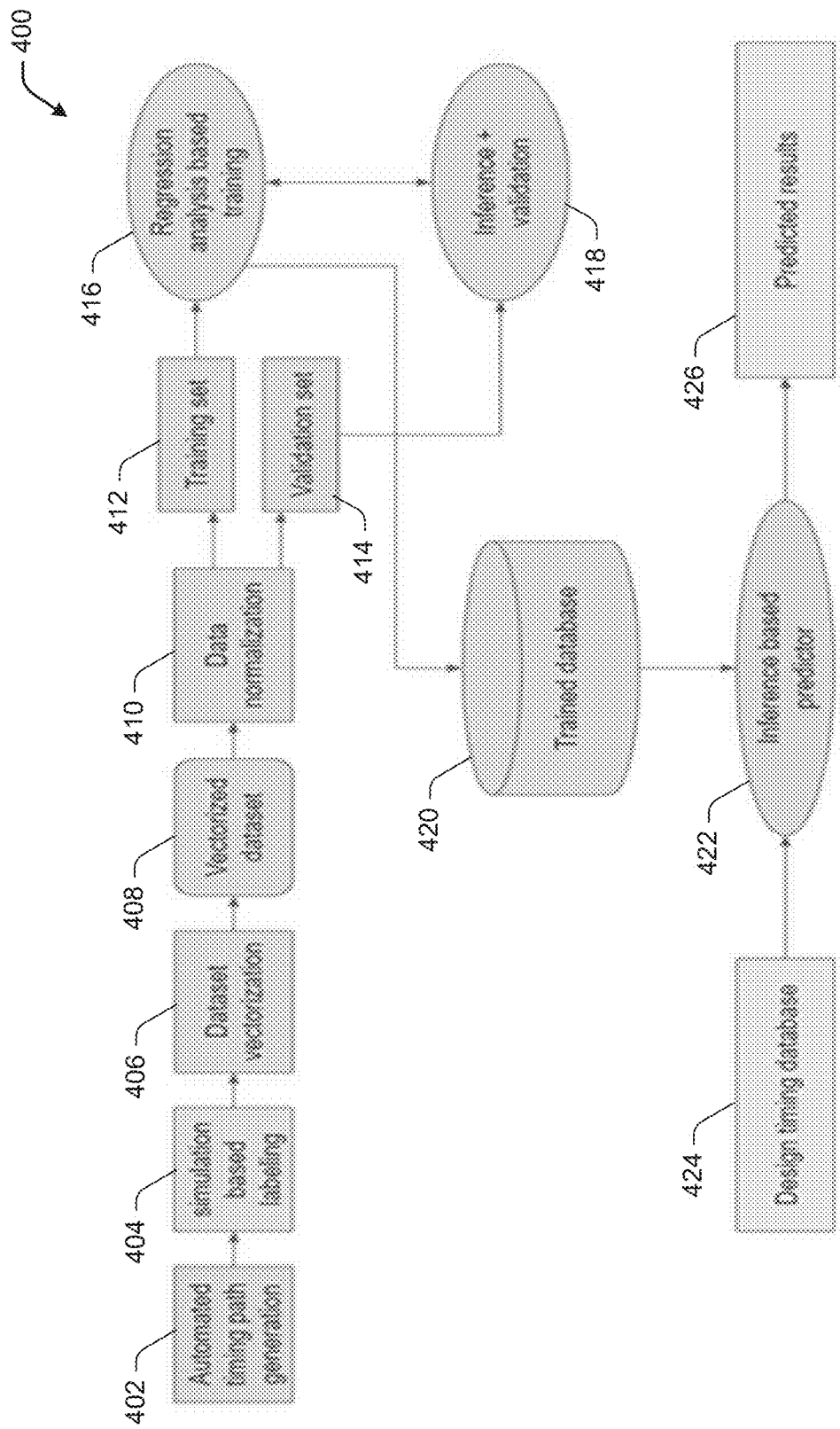
FIG. 4 illustrates a block diagram of an example dataset vectorization process flow that can be performed to facilitate generating a vectorized dataset that can be employed to facilitate training a trained database, in accordance with various aspects and embodiments of the disclosed subject matter.

Turning to FIG. 4 (along with FIG. 2), FIG. 4 illustrates a block diagram of an example dataset vectorization process flow 400 that can be performed to facilitate generating a vectorized dataset that can be employed to facilitate training a trained database (e.g., trained database 220), in accordance with various aspects and embodiments of the disclosed subject matter. The DMC 202 can receive respective items of timing path information relating to respective sample timing paths of a set of sample timing paths (e.g., agnostic, generic, or exemplary timing paths) from a desired source (e.g., a user, or a component or device). The DMC 202 can perform automated timing path generation (as depicted at block 402 of the process flow 400 of FIG. 4) to determine or generate respective sample timing paths of the set of sample timing paths based at least in part on the results of analyzing the respective items of timing path information. The sample timing paths can be the types of timing paths that often can be expected to be implemented in an integrated circuit design, wherein the sample timing paths can be associated with electronic elements (e.g., electronic elements or other integrated circuit components, such as logic gates) in the integrated circuit design.

It is to be appreciated and understood that, in some embodiments, in addition to receiving the respective items of timing path information relating to the respective sample timing paths, the DMC 202 can receive analysis vectorized data or modified analysis vectorized data from the density analysis component 230, or other information (e.g., other timing path information) determined based at least in part on the analysis vectorized data or the modified analysis vectorized data from the density analysis component 230 or another component of the DMC 202, and can perform automated timing path generation to determine or generate respective timing paths based at least in part on the results of analyzing such analysis vectorized data, modified analysis vectorized data, or other information (e.g., other timing path information). While various processes (e.g., simulation, abstraction, filtering, vectorization, . . . ) of the process flow 400 will be described herein with regard to the timing path information relating to respective sample timing paths of a set of sample timing paths, it is to be appreciated and understood that same or similar processes can be applied to the information relating to the timing paths determined from the analysis vectorized data, the modified analysis vectorized data, or the other information.

The simulator component 206 can perform a simulation based labeling process to facilitate simulating operation of the respective sample timing paths (as depicted at block 404 of the process flow 400). The simulator component 206 can analyze the respective sample timing paths and/or the respective items of timing path information associated with the respective sample timing paths. Based at least in part on the results of the analysis, the simulator component 206 can simulate the respective sample timing paths (e.g., simulate the operation, performance, and/or reactions or responses of the respective sample timing paths) to generate respective items of simulation data that can be associated with (e.g., can represent, correspond to, be indicative of) the simulation of the respective timing path properties and the respective operating conditions (e.g., PVT conditions, latencies, throughput conditions, and/or parasitic conditions, . . . ) associated with the respective sample timing paths. In some embodiments, the simulation performed by the simulator component 206 can be or can comprise, for example, a spice-based simulation of the respective sample timing paths based at least in part on the respective items of timing path information.

Figure 5:
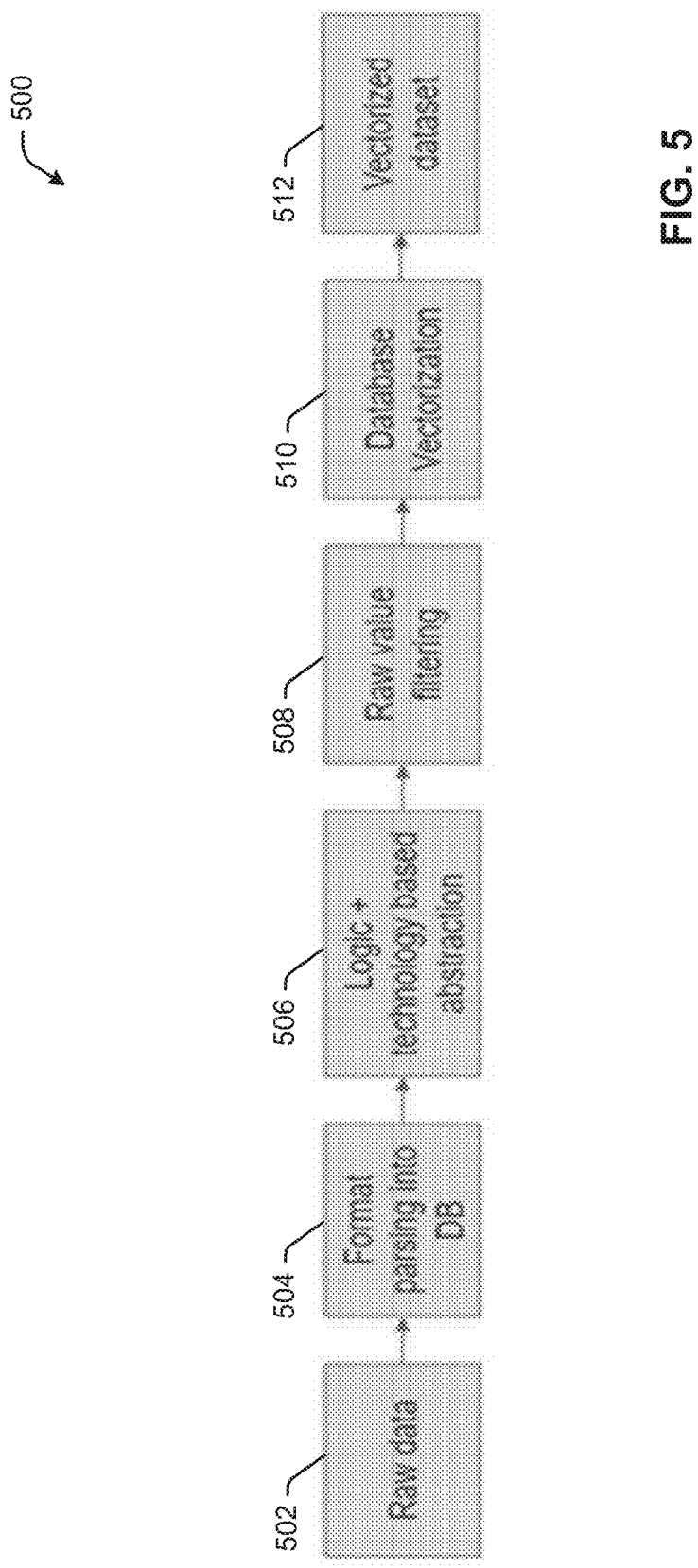
FIG. 5 illustrates a block diagram of an example dataset vectorization process flow that can be performed to facilitate generating a vectorized dataset that can be employed to facilitate training a trained database, in accordance with various aspects and embodiments of the disclosed subject matter.

The DMC 202 can employ the formatting component 208, abstractor component 210, filter component 212, and vectorizer component 214 to facilitate performing desired dataset vectorization on the respective items of simulation data (as depicted at block 406 of the process flow 400), which can be produced as a result of the simulation of the respective sample timing paths, to generate a vectorized dataset (e.g., vectorized data) (as depicted at block 408 of the process flow 400), as more fully described herein, for example, with regard to the process flow 300 of FIG. 3, the dataset vectorization process flow 500 of FIG. 5, or as otherwise described herein.

In certain embodiments, the normalization component 216 can perform data normalization on the vectorized data (as depicted at block 410 of the process flow 400) to normalize the respective items of vectorized data of the vectorized dataset, in accordance with the defined design management criteria. For example, the normalization component 216 can normalize the respective items of vectorized data to suppress (e.g., modify vectorized data to suppress) or remove any items of vectorized data that are determined by the normalization component 216 to be outlier data relative to other items of vectorized data.

The training component 218 can utilize the items of vectorized data to perform training with regard to operating conditions and properties of timing paths (e.g., sample timing paths or other timing paths) to generate the trained database 220 (as indicated by blocks 412, 414, 416, 418, and 420 of the process flow 400). The training component 218 can divide (e.g., partition, separate, allocate, apportion, or split, . . . ) the items of vectorized data (e.g., items of normalized vectorized data, as normalized by the normalization component 216) into a set of training data (as indicated by block 412 of the process flow 400) and a set of validation data (as indicated by block 414 of the process flow 400), in accordance with the defined design management criteria relating to database training. For example, the training component 218 can divide the items of vectorized data to allocate a desired first portion (e.g., 80%, or another desired percentage that is greater than or less than 80%) of the items of vectorized data to be the set of training data and a desired second portion (e.g., 20%, or another desired percentage that is less than or greater than 20%) of the items of the vectorized data to be the set of validation data, based at least in part on whatever respective allocations of training data and validation data is determined to be desirable (e.g., suitable or optimal), in accordance with the defined design management criteria.

The training component 218 can perform regression analysis based training on the set of training data (as indicated by block 416 of the process flow 400). For instance, the training component 218 can perform statistical regression analysis on the set of training data using a desired statistical regression analysis algorithm(s), and can generate preliminary analysis results based at least in part on the statistical regression analysis performed on the set of training data.

The training component 218 can utilize the set of validation data to facilitate performing inference and validation on the preliminary analysis results (as indicated by block 418 of the process flow 400). For example, the training component 218 can determine whether the preliminary analysis results, resulting from performing the statistical regression analysis on the set of training data, is validated based at least in part on the inference and validation process performed on the preliminary analysis results using the set of validation data. If the training component 218 determines that the preliminary analysis results are validated (e.g., the preliminary analysis results are determined to be reasonable or suitable), in accordance with the defined design management criteria relating to database training, the training component 218 can determine that the preliminary analysis results can be finalized analysis results that can be stored in the trained database (e.g., trained database 220) (as indicated by block 420 of the process flow 400). It is to be appreciated and understood that, in other embodiments, alternatively or additionally, the training component 218 can perform another type of analysis on the items of vectorized data to determine or generate finalized analysis results (e.g., finalized analysis results that can be, can comprise, or can be utilized to determine or generate a trained model), wherein such other type of analysis performed on the items of vectorized data can involve using a desired training algorithm that can relate to neural networks or other desired machine learning.

The finalized analysis results can be, can comprise, or can be utilized to determine or generate (e.g., create) a trained model. The trained database 220 can be or can comprise the trained model, which can model the timing paths (e.g., sample timing paths or other timing paths), including modeling the respective properties and operating conditions of the timing paths. In some embodiments, the trained database 220 can comprise numerical values (e.g., vectors comprising numeric values) relating to operating conditions and properties of timing paths (e.g., sample timing paths or other timing paths) that can be desirable (e.g., suitable, acceptable, or optimal) for use by the DMC 202 in inferring, predicting, or determining operating conditions and properties of timing paths of the integrated circuit design. Desirable (e.g., suitable, acceptable, or optimal) finalized analysis results can enable the trained database 220, including the trained model, to cover not only the explicit cases (e.g., operating conditions, properties, . . . ) associated with the timing paths (e.g., sample timing paths or other timing paths) explicitly considered in forming the trained database 220, but also can be generic enough that inference and prediction can be used with the trained database 220 (e.g., trained database information of the trained database 220 that comprises or is determined based on the finalized analysis results) to infer or predict other cases (e.g., other operating conditions, other properties, . . . ) associated with other types of timing paths not explicitly covered or addressed when forming the trained database 220.

If the training component 218 determines that the preliminary analysis results are not validated, in accordance with the defined design management criteria, the training component 218 can determine that modifications are to be made to the sample timing paths, the abstraction process, the vectorization process, the training process, or another process, parameter, aspect, or criteria associated with determining or training the trained database 220 to facilitate improving preliminary analysis results and yielding preliminary analysis results that can be validated to render finalized analysis results that can be used to generate the trained database 220, in accordance with the defined design management criteria.

In some embodiments, additionally or alternatively, the training component 218 can perform desired analysis on the items of vectorized data using one or more desired machine learning techniques and algorithms to perform the training and generate the trained database 220 and associated trained model.

The disclosed subject matter can employ an inference based predictor (e.g., predictor component 226) that can receive vectorized input data from the design timing database and training information (e.g., in vectorized form) from the trained database (e.g., trained database 220) (as indicated at blocks 420, 422, and 424, respectively, of the process flow 400), wherein the vectorized input data can relate to analysis (e.g., STA) timing path data regarding an operating condition(s) and/or property(ies) associated with a timing path(s) of an integrated circuit design. The design timing database can be or can comprise the single operating condition (e.g., PVT) timing database. The inference based predictor (e.g., predictor component 226) can predict, determine, or generate predicted results regarding one or more other operating conditions associated with one or more other properties (e.g., characteristics, attributes) associated with one or more other timing paths of the integrated circuit design based at least in part on analysis of the training information (e.g., training information, in vectorized form, of the trained model and/or trained database 220) and the vectorized input data relating to the analysis timing path data regarding the operating condition(s) and/or property(ies) associated with the timing path(s) of the integrated circuit design, in accordance with the defined design management criteria (as indicated at block 426 of the process flow 400). The DMC 202 can utilize the predicted results to determine the one or more other operating conditions associated with the one or more other properties associated with the one or more other timing paths of the integrated circuit design, determine another portion (e.g., other electronic elements, other timing paths, . . . ) of the integrated circuit design, and/or determine enhancements that can be made to the integrated circuit design.

Referring to FIG. 5 (along with FIG. 2), FIG. 5 illustrates a block diagram of an example dataset vectorization process flow 500 that can be performed to facilitate generating a vectorized dataset that can be employed to facilitate training a trained database (e.g., trained database 220), in accordance with various aspects and embodiments of the disclosed subject matter. As part of the dataset vectorization process flow 500, the DMC 202 can receive respective raw items of timing path information relating to respective sample timing paths of a set of timing paths from a user (e.g., via a user interface associated with the DMC 202) or from another component or device associated with the DMC 202. The set of sample timing paths can comprise sample timing paths that often can be found or utilized in integrated circuits. In some embodiments, the raw items of timing path information also can relate to other timing paths under consideration (e.g., information received from the vectorization density analysis). The DMC 202, employing the simulator component 206, can perform a simulation (e.g., a spice-based simulation) of the respective sample timing paths (or other timing paths under consideration) based at least in part on the respective raw items of the timing path information. Based at least in part on the simulation, the simulator component 206 can determine or generate simulation results, comprising raw items of the simulation data, of the respective operating conditions and timing properties, and the respective reactions or responses of, the respective sample timing paths (or other timing paths under consideration). The DMC 202 can access and receive the raw simulation results, comprising raw items of the simulation data, as generated by the simulator component 206 (as indicated by block 502 of the dataset vectorization process flow 500).

The DMC 202, employing the formatting component 208, can parse the raw items of the simulation data relating to the sample timing paths (or other timing paths under consideration) and format the raw items of the simulation data (e.g., labeled simulation data) into a database, using a desired format (e.g., desired database format), in accordance with the defined design management criteria (as indicated by block 504 of the dataset vectorization process flow 500). For instance, the formatting component 208 can parse the raw items of the simulation data. Based at least in part on the results of parsing the raw items of the simulation data, the formatting component 208 can format the raw items of the simulation data to generate items of formatted simulation data, and can insert the items of the formatted simulation data into the database using and in accordance with the desired (e.g., suitable, acceptable, or preferred) database format.

The DMC 202, employing the abstractor component 210, can perform a desired logic and technology based abstraction process on the items of the formatted simulation data to facilitate abstracting the items of the formatted simulation data (as indicated by block 506 of the dataset vectorization process flow 500). The abstractor component 210 can analyze the raw items of formatted simulation data, including the respective (e.g., unique or different) properties of the respective raw items of formatted simulation data. Based at least in part on the results of the analysis, the abstractor component 210 can abstract the raw items of formatted simulation data to generate respective representative bins associated with the respective properties (e.g., respective characteristics), wherein the respective representative bins can comprise or be associated with the respective subsets of the respective raw items of formatted simulation data, in accordance with defined design management criteria relating to abstraction of data. For instance, the abstractor component 210 can abstract a larger number (e.g., 1,000,000) of unique properties of the sample timing paths (or other timing paths under consideration) down to a relatively smaller number (e.g., 100) of representative properties associated with the sample timing paths (or other timing paths under consideration). The abstractor component 210 can perform such data abstraction based at least in part on the respective properties, such as, for example, the respective latencies, respective slew rates, respective parasitic conditions, respective types of technologies, respective types of logic (e.g., types of logic gates), respective usage conditions, and/or respective other factors, of or associated with the respective raw items of formatted simulation data.

A representative bin and associated representative property (e.g. representative field) of the bin can encompass or be associated with a subset of unique properties of a subset of the sample timing paths (or a subset of other timing paths under consideration). For example, the abstractor component 210 can map a subset (e.g., 30 or other number determined to be appropriate) of unique properties of a subset of sample timing paths (or a subset of other timing paths under consideration) to a representative property (e.g., representative field) that can encompass the subset of unique properties at a more abstract (e.g., less detailed) level than the more detailed level of the subset of unique properties.

In certain embodiments, with regard to each representative bin, the DMC 202, employing the filter component 212, can filter raw data values of or associated with a representative bin, based at least in part on a desired filter, to generate filtered data that can be associated with (e.g., representative of) the representative bin, in accordance with defined design management criteria related to filtering of raw data, wherein the raw data values can be raw data values of the respective raw items of formatted simulation data associated with the respective unique properties of the subset of unique properties associated with the representative bin. The filter component 212, employing the desired filter, can filter the raw data values of the respective raw items of formatted simulation data of or associated with the representative bin, for example, by determining (e.g., calculating) the sum value of the raw data values, determining the mean value of the raw data values, determining the mean plus N*sigma values of the raw data values, determining the average value of the raw data values, determining the root mean square value of the raw data values, filtering out certain raw data values of certain items of the simulation data determined to be outlier data values, and/or performing other desired operations (e.g., mathematical operations) on the raw data values of the respective raw items of formatted simulation data.

The DMC 202, employing the vectorizer component 214, can perform a vectorization transformation on the filtered database to vectorize the respective items of filtered data (e.g., filtered data values) associated with respective representative bins to generate the respective items of vectorized data associated with respective representative bins, wherein there can be deterministic fields for each representative bin. In some embodiments, the vectorizer component 214 can vectorize each of the respective items of filtered data by converting (e.g., modifying) each of the items of filtered data to represent each of the items of filtered data in the form of a numeric vector (e.g., item of vectorized data) that can correspond to (e.g. be representative of) that item of filtered data.

Figure 6:
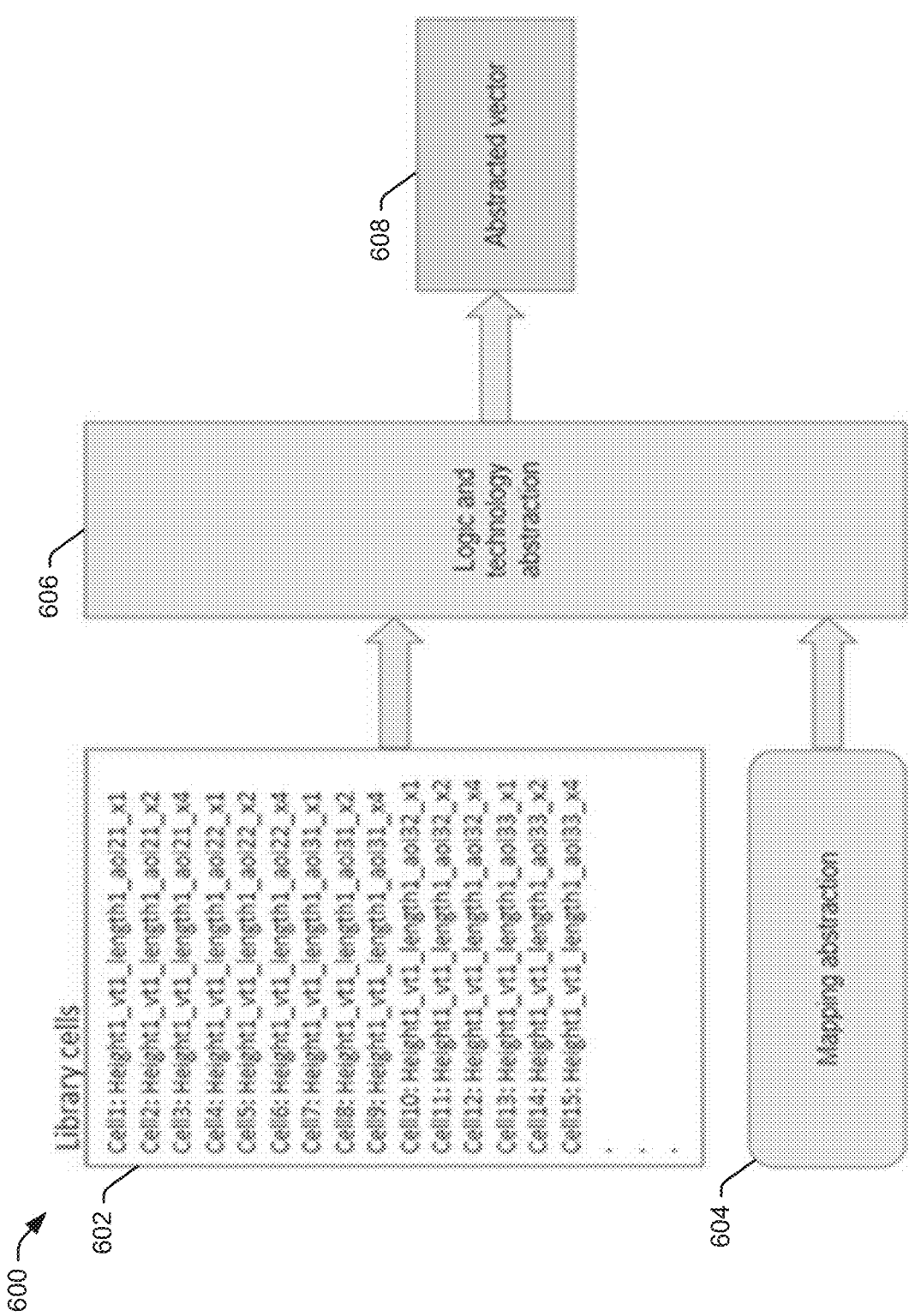
FIG. 6 illustrates a block diagram of an example, non-limiting embodiment of an abstraction process that can be employed to abstract data relating to timing paths, such as sample timing paths or other timing paths, in connection with determining or training a trained database for use in enhancing an integrated circuit design, in accordance with various aspects and embodiments of the disclosed subject matter.

FIG. 6 illustrates a block diagram of an example, non-limiting embodiment of an abstraction process 600 that can be employed to abstract data relating to timing paths, such as sample timing paths or other timing paths, in connection with determining or training a trained database for use in enhancing an integrated circuit design, in accordance with various aspects and embodiments of the disclosed subject matter. In accordance with the abstraction process 600, there can be library cells that can be sample (e.g., example, exemplary, or agnostic) library cells that can be expected to often be utilized in integrated circuit designs (as indicated at block 602 of the abstraction process 600). The library cells can comprise a variety of cells, such as, for example, Cell1, Cell2, Cell3, . . . , and/or Cell15, etc.

The respective cells of the library cells can have respective properties (e.g., characteristics, attributes, and/or specifications, . . . ). The respective properties can comprise, for example, channel height of a cell, channel length of a cell, a voltage threshold of a cell, a general type of logic gate of a cell, a particular type or configuration of a cell, a drive strength of a cell, and/or other desired properties of a cell. For example, the example cells (e.g., Cell1 through Cell15) of the library cells can have respective channel heights, wherein, in this example, the respective cells can each have a channel height of Height1, which can represent a certain channel height. The example cells of the library cells can have respective channel lengths, wherein, in this example, the respective cells can each have a channel length of length1, which can represent a particular channel length. The example cells of the library cells can have respective voltage thresholds (vt), wherein, in this example, the respective cells can each have a voltage threshold of vt1, which can represent a specified voltage threshold.

The example cells of the library cells also can be respective general types of logic gates, wherein, in this example, the respective cells each can be an AND-OR-Inverter (aoi), although in a variety of other embodiments, there can be a variety of other general types of logic gates employed in connection with an integrated circuit design or analysis relating to an integrated circuit design. The example cells of the library cells also can be respective particular types or configurations of logic gates, wherein, in this example, some of the cells (e.g., Cell1, Cell2, and Cell3) can be aoi21, certain other cells (e.g., Cell4, Cell5, and Cell6) can be aoi22, still other cells (e.g., Cell7, Cell8, and Cell9) can be aoi31, other cells (e.g., Cell10, Cell11, and Cell12) can be aoi32, and yet other cells (e.g., Cell13, Cell14, and Cell15) can be aoi33. An aoi21 can be, for example, a two-input AND gate and a one-input AND gate (e.g., a wire) all feeding into a two-input NOR gate; an aoi22 can be a two-by-two (2×2) Input AND-NOR Gate; an aoi31 can be a three-input AND gate and a one-input AND gate (a wire) all feeding into a two-input NOR gate; and the other particular aoi types (e.g., aoi32, aoi33) can be understood and derived, accordingly.

The example cells of the library cells each can have respective drive strengths. In this particular example of library cells, some of the cells (e.g., Cell1, Cell4, Cell7, Cell10, Cell13) can have a drive strength of 1 (e.g., x1), certain other cells (e.g., Cell2, Cell5, Cell8, Cell11, Cell14) can have a drive strength of 2 (e.g., x2), and still other cells (e.g., Cell3, Cell6, Cell9, Cell12, Cell15) can have a drive strength of 4 (e.g., x4). With regard to a set of properties associated with a set of timing paths (e.g., sample timing paths and/or other timing paths under consideration), the DMC 202, employing the abstractor component 210, can perform a mapping abstraction to facilitate mapping respective (e.g., unique) properties of respective timing paths of the set of timing paths to respective representative properties of a set of representative properties (as indicated at block 604 of the abstraction process 600), wherein the respective representative properties can be associated with respective representative bins.

In accordance with the example abstraction process 600, the DMC 202, employing the abstractor component 210, can perform logic and technology abstraction to abstract data, such as, for example, simulation data of simulation results of the simulation of the timing paths associated with the cells of the library cells, based at least in part on the information (e.g., simulation data of simulation results associated with sample timing paths or other timing paths) relating the cells of the library cells and the mapping abstraction (as indicated at block 606 of the abstraction process 600), as more fully described herein. For instance, the abstractor component 210 can map (e.g., employing the mapping abstraction) a subset (e.g., 30 or other number determined to be appropriate) of respective (e.g., particular or unique) properties associated with a subset of sample timing paths (or a subset of other timing paths under consideration) to a representative property (e.g., a representative field associated with a representative property) that can encompass the subset of respective properties at a more abstract (e.g., less detailed) level than the more detailed level of the subset of respective properties, based at least in part on the information (e.g., the simulation data) relating the cells of the library cells and the mapping abstraction, wherein the representative property can be associated with a representative bin. Such abstraction can be performed by the abstractor component 210 for each of a number of subsets of respective properties associated with respective subsets of sample timing paths (or a subset of other timing paths under consideration) to a respective representative property of a set of representative properties and associated respective representative bin of a set of representative bins. For example, with regard to a relatively high number (e.g., 1,000,000 or other desired higher number) of unique properties associated with the sample timing paths (or other timing paths under consideration), the abstractor component 210 can map respective unique properties of the relatively high number of unique properties (e.g., employing the mapping abstraction and logic and technology abstraction processes) to respective representative properties of a relatively lower number (e.g., 100 or other desired lower number) of respective representative properties that can be associated with respective representative bins.

As a result of the logic and technology abstraction performed in the abstraction process 600 (as indicated at block 606 of the abstraction process 600), the DMC 202 can generate abstracted vectors (as indicated at block 608 of the abstraction process 600), wherein the abstracted vectors, as desirably processed (e.g., further processed, where appropriate), can be utilized to facilitate determining or training the trained database 220, as more fully described herein. The abstracted vectors can be vectorized data, which can be produced based at least in part on abstracted data (e.g., items of abstracted data) that can be determined or generated from the logic and technology abstraction process (e.g., as indicated at block 606), wherein the abstracted data can be filtered to generate filtered data, and wherein the filtered data can be vectorized to generate vectorized data, which can be normalized, as more fully described herein, to result in vectorized data (e.g., items of normalized vectorized data) that can be used to facilitate determining or training the trained database 220.

With further regard to vectorization of data (e.g., items of data derived from simulation results) relating to timing paths (e.g., sample timing paths or other timing paths under consideration), the DMC 202 can employ a desired vector format, comprising various respective formats, in connection with vectorizing data, in accordance with the defined design management criteria. The DMC 202 can structure the various formats around a timing estimator. With regard to an operating condition vector (e.g., a PPVT vector), the DMC 202 can structure the operating condition vector to have a desired number of field positions that can denote a simulation condition (e.g., a simulation condition obtained from the simulation of sample timing paths) as a numerical vector. The respective field positions of the operating condition vector can be space delimited, as desired, and each of the field positions can have an appropriate numerical value, which, in some embodiments, can be a relatively small numerical value. In accordance with various embodiments, the desired number of field positions can be 5 field positions, more than 5 field positions, or less than 5 field positions, as indicated or specified by the defined design management criteria.

With regard to the wire process, the wire process can be desirably quantized (e.g., very or significantly quantized), and, as a result, it can be desirable to assign numerical values to a field. TABLE 1 provides some example numerical values that can be assigned to a field (e.g., by the DMC 202) with regard to an integrated circuit design's interconnect process.

TABLE 1

Example wire process

| Wire corner | Vector value (e.g., process sigma from mean) |
|---|---|
| RCWorst | −3 |
| RCWorst_CCWorst_T | −3.2 |
| RCWorst_CCWorst | −3.5 |
| CWorst | −2 |
| CWorst_CCWorst_T | −2.2 |

TABLE 1-continued

Example wire process

| Wire corner | Vector value (e.g., process sigma from mean) |
|---|---|
| CWorst_CCWorst | −2.5 |
| Typical | 0 |
| Typical_CCbest | 0.5 |
| Typical_CCWorst | −0.5 |
| Cbest | 2 |
| Cbest_CCbest_T | 2.2 |
| Cbest_CCbest | 2.5 |
| RCbest | 3 |
| RCbest_CCbest_T | 3.2 |
| RCbest_CCbest | 3.5 |

The variation to the wire process can be associated with a numerical value for vectorization purposes, and TABLE 1 provides an example of how this can be accomplished, in accordance with the disclosed subject matter. It is to be appreciated and understood that, in other embodiments, depending on the type of circuitry, type of technology, etc., the disclosed subject matter can employ additional or different fields and/or can assign additional or different numerical values to the fields than those provided in the example TABLE 1.

With regard to the gate process of Nfet, the gate process can have, for example, a monte-carlo supported process variation associated with it, however, the disclosed subject matter can start with a corner based simulation condition. In some embodiments, the disclosed subject matter (e.g., the DMC 202) can employ a look-up table, such as example TABLE 2, that can include desired vector values for various process corners (e.g., basically S=−3, T=0, F=3).

TABLE 2

Example gate process - Nfet

| Process corner | Vector value (e.g., process sigma from mean) |
|---|---|
| SS | −3 |
| SF | −3 |
| TT | 0 |
| FS | 3 |
| FF | 3 |

It is to be appreciated and understood that, in other embodiments, depending on the type of circuitry, type of technology, etc., the disclosed subject matter can employ additional or different process corners and/or can assign additional or different numerical vector values than those provided in the example TABLE 2.

With regard to the gate process of Pfet, the gate process can have, for example, a monte-carlo supported process variation associated with it, however, the disclosed subject matter can start with a corner based simulation condition. In some embodiments, the disclosed subject matter (e.g., the DMC 202) can employ a look-up table, such as example TABLE 3, that can include desired vector values for various process corners (e.g., basically S=−3, T=0, F=3).

TABLE 3

Example gate process - Pfet

| Process corner | Vector value (e.g., process sigma from mean) |
|---|---|
| SS | −3 |
| SF | 3 |
| TT | 0 |
| FS | −3 |
| FF | 3 |

It is to be appreciated and understood that, in other embodiments, depending on the type of circuitry, type of technology, etc., the disclosed subject matter can employ additional or different process corners and/or can assign additional or different numerical vector values than those provided in the example TABLE 3.

As a non-limiting example of operating condition vectors, to describe an operating condition (e.g., a PPVT condition) of typical RC, TT, 0.7V (0.7 volts (V)), 100 C (e.g., 100 degrees Celsius (C)), the DMC 202 can generate an operating condition vector as: [0 0 0 0.7 100], wherein the 0 values in the first three fields of the vector can be obtained from TABLE 1, TABLE 2, and/or TABLE 3 (e.g., wire corner of Typical can have a vector value of 0; process corner of TT can have a vector value of 0), and wherein the 0.7 in the fourth field of the vector can represent the 0.7V value, and the 100 in the fifth field of the vector can represent the 100 C value. As another non-limiting example of operating condition vectors, to describe an operating condition (e.g., a PPVT condition) of typical rcworst_ccworst_T, SS, 0.8V (0.8 volts (V)), −40 C (e.g., −40 degrees Celsius (C)), the DMC 202 can generate the operating condition vector as: [−3.2 −3 −3 0.8 −40],], wherein the 0 values in the first three fields of the vector can be obtained from TABLE 1, TABLE 2, and/or TABLE 3 (e.g., wire corner of rcworst_ccworst_T can have a vector value of −3.2; process corner of SS can have a vector value of −3), wherein the 0.8 in the fourth field of the vector can represent the 0.8V value, and the −40 in the fifth field of the vector can represent the −40 C value.

In certain embodiments, the DMC 202 can employ an abstract gate list that can comprise desired gate abstractions, which the DMC 202 can utilize in abstracting data (e.g., simulation data of simulation results) relating to sample timing paths. For example, with regard to logic functions of logic gates, the gate (e.g., logic gate) abstractions employed by the DMC 202 can support the logic functions of: 1 stack; 2 stack; 3 stack; 4 stack; 2 stage gate, with both stages being an inverter; 2 stage gate, with the first stage being 2-stack and the second stage being an inverter (e.g., clock gater clock-to-out time (tcq) can be included in this); 3 stage flip-flop (clock-to-out time (tcq)); 4 stage flip-flop (tcq); flip-flop (input setup time (tsu)); flip-flop (input hold time (thold)); clock-gater/latch (tsu); and clock-gater/latch (thold). It is to be appreciated and understood that, in accordance with various embodiments, the disclosed subject matter is not limited to these logic functions and gate abstractions, and the disclosed subject matter can employ additional or alternative logic functions and gate abstractions than those referenced above.

In certain embodiments, in terms of gate voltage threshold (vt) types, the DMC 202 can employ libraries that can be based at least in part on extra-low voltage thresholds (ELVT), ultra-low voltage thresholds (ULVT), low voltage thresholds (LVT), standard voltage thresholds (SVT), or high voltage thresholds (HVT). If the process VT support changes, the DMC 202 can adjust the libraries accordingly.

With regard to channel length, the disclosed subject matter can comprise desired channel length values that can be supported by the integrated circuit technology employed. For example, with regard to various integrated circuit technologies, for channel length, there can be respective (e.g., different) channel length values that can be supported by the respective integrated circuit technologies. There can be various respective (e.g., different) cell heights depending in part on the integrated circuit technology employed in the integrated circuit design. The DMC 202 can employ a same or similar database with regard to the respective (e.g., different) cell heights (e.g., if determined to be suitable), or can utilize respective databases having respective dimensionalities with regard to the respective cell heights, as desired. This quantization relating to process supported valid channel lengths and process supported valid cell heights can be desirable (e.g., suitable, optimal, perfect, or substantially perfect) for dimension bounding (e.g., quantization relating to (e.g., based at least in part on) process supported valid channel lengths and process supported valid cell heights can be desirable for application during the data vectorization processes described herein). Other process nodes can have something similar to this.

In some embodiments, with regard to a simulated data storage vector (SDSV), the DMC 202 can separate the simulated data associated with timing paths (e.g., sample timing paths) by the types of information the DMC 202 can desire to collect. The types of information can comprise, for example, output transition unateness, mean delay, mean input slew rate/mean data slew rate (flip-flop or latch), mean output slew rate/mean clock slew rate (flip-flop or latch), sigma of delay, slew rates, and/or other desired types of information. In certain embodiments, the storage vector (e.g., SDSV) can be a singular line of data, space delimited, to store the simulation results. Each field can correspond to the values represented by the various components of the timing path. In many cases, the timing path will not have each field populated with particular values, and, with regard to a field that is not populated with a particular value, the DMC 202 can assign such field a desired value (e.g., a default value, which can be 0). Each entry can be meant to represent a single path of simulation, while maintaining flexibility to support additional fields.

With regard to dataset format, the DMC 202 can employ a dataset format that can be based at least in part on combining of multiple vectors to describe the timing path, the PPVT it was simulated in and the PPVT it is meant to estimate. All fields in the dataset format can be space delimited, and in the vector based representation, it can be, for example: [$PPVT_{start}$ $SDSV_{PPVTstart}$ $PPVT_{target}$]. This can be the entry the DMC 202 can pass in for inference. In the case of the training dataset, the label also can be present so each entry can be represented as, for example: [$PPVT_{start}$ $SDSV_{PPVTstart}$ $PPVT_{target}$]: label (full path delay of $PPVT_{target}$).

In view of the example systems described above, methods that may be implemented in accordance with the described subject matter may be better appreciated with reference to the flow charts of FIGS. 7-10. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 7:
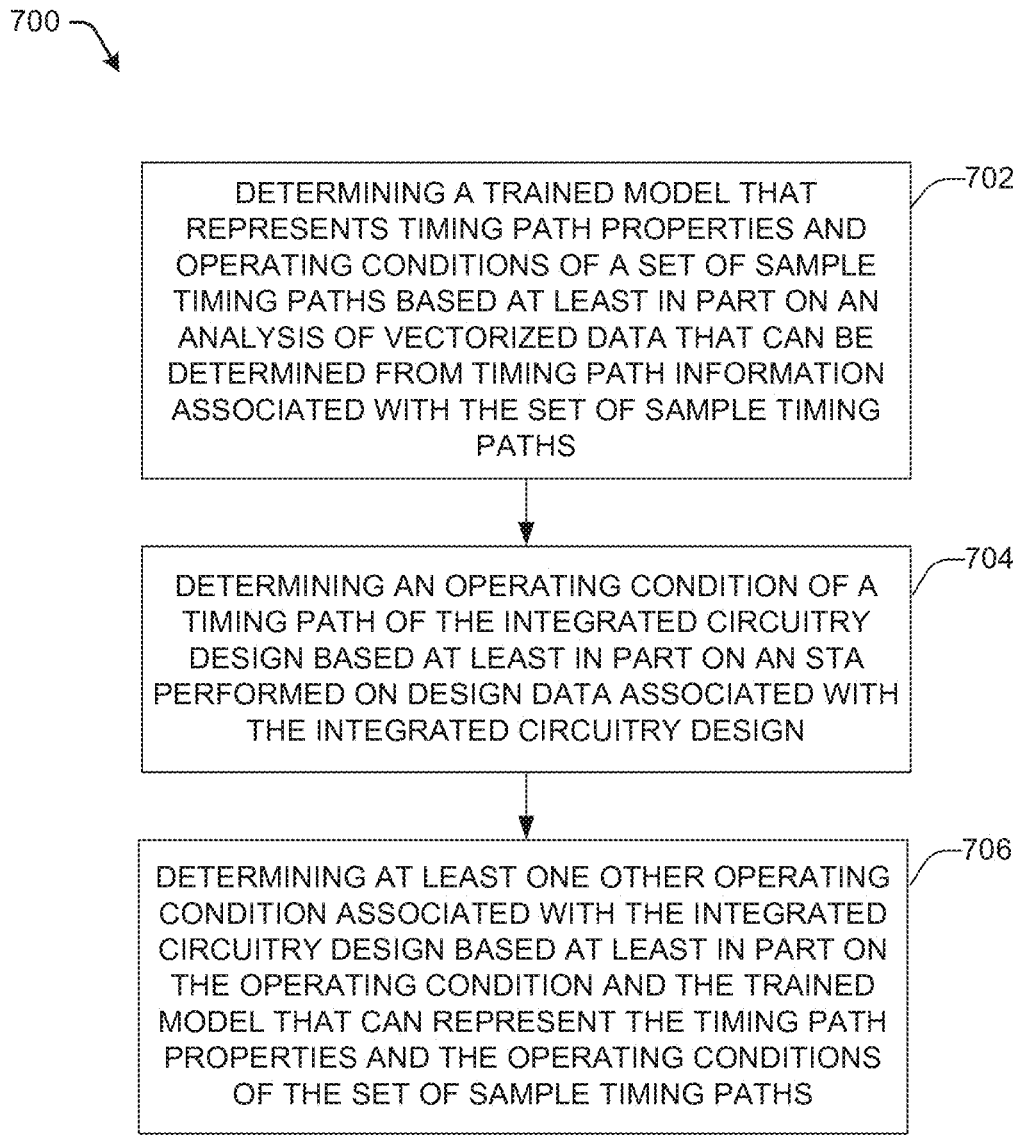
FIG. 7 depicts a flow diagram of an example method that can efficiently enhance an integrated circuit design by employing multi-operating condition frequency determination or prediction for statically timed designs through statistical analysis, in accordance with various aspects and embodiments of the disclosed subject matter.

FIG. 7 depicts a flow diagram of an example method 700 that can efficiently enhance an integrated circuit design by employing multi-operating condition frequency determination or prediction for statically timed designs through statistical analysis, in accordance with various aspects and embodiments of the disclosed subject matter. The method 700 can determine timing path frequency associated with an integrated circuitry design, for example. For instance, the method 700 can perform multi-operating condition frequency determinations and/or predictions for statically timed integrated circuit designs through statistical analysis. The method 700 can be implemented by a system that can comprise the DMC, a processor component, and/or a data store, for example.

At block 702, a trained model that represents timing path properties and operating conditions of a set of sample timing paths can be determined based at least in part on an analysis of vectorized data that can be determined from timing path information associated with the set of sample timing paths. The DMC can determine or create the trained model, which can model or represent the timing path properties and the operating conditions of the set of sample timing paths, based at least in part on results of the analysis of the vectorized data, wherein the vectorized data can be determined (e.g., by the DMC) from the timing path information associated with the set of sample timing paths. In accordance with various embodiments, the DMC can perform a defined analysis on the vectorized data to facilitate training, determining, and/or creating the trained model. For example, the DMC can perform the defined analysis on the vectorized data using a desired training algorithm that can relate to statistical regression analysis, neural networks, or other desired machine learning techniques.

In certain embodiments, the DMC can perform a simulation (e.g., a spice-based simulation) of the sample timing paths, based at least in part on the timing path information, to generate simulation data that can simulate the respective timing path properties and respective operating conditions of respective sample timing paths of the set of sample timing paths. The DMC can perform a vectorization process (e.g., spice path vectorization) on the simulation data to generate the vectorized data (e.g., convert the simulation data to vectorized data) that can represent the respective timing path properties and the respective operating conditions of the respective sample timing paths as respective numerical vectors.

At block 704, an operating condition of a timing path of the integrated circuitry design can be determined based at least in part on an STA performed on design data associated with the integrated circuitry design. The DMC, employing the STA component, can perform the STA on the design data associated with the integrated circuitry design, and can determine the operating condition of the timing path of the integrated circuitry design based at least in part on the results of the STA.

At block 706, at least one other operating condition associated with the integrated circuitry design can be determined based at least in part on the operating condition and the trained model that can represent the timing path properties and the operating conditions of the set of sample timing paths. The DMC can predict and/or determine the at least one other operating condition associated with the integrated circuitry design based at least in part on the operating condition and the trained model.

Figure 8:
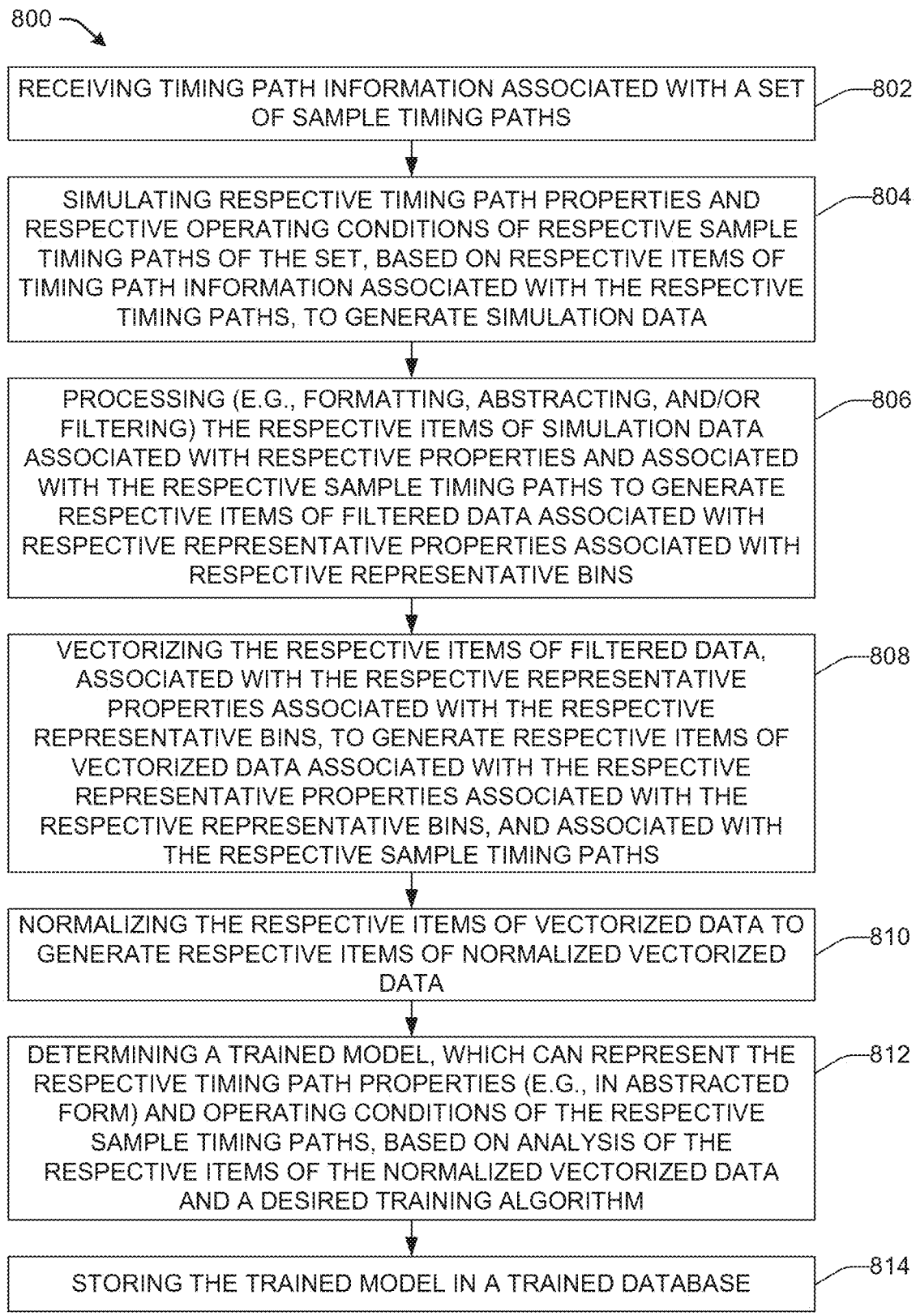
FIG. 8 illustrates a flow diagram of an example method that can determine a trained model that can desirably model or represent sample timing paths that can be the types of timing paths that can be expected to be implemented in an integrated circuit design (or other timing paths, such as, e.g., timing paths of an integrated circuit design), to efficiently enhance the integrated circuit design, in accordance with various aspects and embodiments of the disclosed subject matter.

FIG. 8 illustrates a flow diagram of an example method 800 that can determine a trained model that can desirably model or represent sample timing paths that can be the types of timing paths that can be expected to be implemented in an integrated circuit design (or other timing paths, such as, e.g., timing paths of an integrated circuit design), to efficiently enhance the integrated circuit design, in accordance with various aspects and embodiments of the disclosed subject matter. The method 800 can be implemented by a system that can comprise the DMC, a processor component, and/or a data store, for example.

At block 802, timing path information associated with a set of sample timing paths can be received. The DMC can receive respective items of timing path information associated with respective sample timing paths of the set of timing paths. The respective sample (e.g., agnostic or exemplary) timing paths can comprise the types of timing paths that often can be found, or at least can be similar to timing paths that often can be found, in designs of integrated circuits.

At block 804, respective timing path properties and respective operating conditions of respective sample timing paths of the set of sample timing paths can be simulated, based at least in part on the respective items of timing path information associated with the respective timing paths of the set of timing paths, to generate simulation data. The DMC can perform a simulation of the respective sample timing paths, based at least in part on the respective items of timing path information, to generate the simulation data that can simulate the respective timing path properties and the respective operating conditions (e.g., PVT conditions, latencies, throughput conditions, and/or parasitic conditions of timing paths, . . . ) of the respective sample timing paths. In some embodiments, the simulation can be or can comprise, for example, a spice-based simulation of the respective sample timing paths based at least in part on the respective items of timing path information.

At block 806, the respective items of simulation data associated with respective properties and associated with the respective sample timing paths can be processed (e.g., formatted, abstracted, and/or filtered) to generate respective items of filtered data associated with respective representative properties associated with respective representative bins, in accordance with the defined design management criteria relating to such processing of such data. The DMC can process the respective items of simulation data to format the such simulation data to generate respective items of formatted data, abstract the respective items of formatted data to generate respective items of abstracted data associated with the respective representative properties associated with the respective representative bins, and filter the respective items of abstracted data to generate respective items of filtered data associated with the respective representative properties associated with the respective representative bins, as more fully described herein.

At block 808, the respective items of filtered data, associated with the respective representative properties associated with the respective representative bins, can be vectorized to generate respective items of vectorized data associated with the respective representative properties associated with the respective representative bins, and associated with the respective sample timing paths, in accordance with defined design management criteria relating to vectorization of data. The DMC can vectorize (e.g., perform a vector transformation process on) the respective items of filtered data to generate the respective items of vectorized data, in accordance with the defined design management criteria, as more fully described herein. The DMC can determine and generate the respective items of the vectorized data such that they can represent (e.g., in an abstract and vectorized form) the respective items of simulation data associated with the respective sample timing paths in a desired numeric form (e.g., as numeric vectors).

At block 810, the respective items of vectorized data can be normalized to generate respective items of normalized vectorized data. The DMC can normalize the respective items of vectorized data to generate the respective items of normalized vectorized data, as more fully described herein.

At block 812, a trained model, which can represent the respective timing path properties (e.g., in abstracted form) and operating conditions of the respective sample timing paths, can be determined based at least in part on an analysis of the respective items of the normalized vectorized data and a desired training algorithm. The DMC can determine, create (e.g., generate), or train the trained model, which can represent the respective timing path properties (e.g., in abstracted form) and the respective operating conditions associated with the respective sample timing paths, based at least in part on the results of the analysis of the respective items of the normalized vectorized data.

In certain embodiments, the analysis can be or can comprise, for example, a statistical regression analysis that the DMC can perform on the respective items of the vectorized data, in accordance with the desired training algorithm. For example, the DMC can divide (e.g., allocate or apportion) the respective items of the vectorized data (e.g., normalized vectorized data) into a set of training data and a set of validation data, and can perform the statistical regression analysis on the set of training data and validate, or at least attempt to validate, the results of the statistical regression analysis using the set of validation data, as more fully described herein. In other embodiments, the analysis can be, can comprise, or can involve the use of a desired (e.g., a defined, and suitable or optimal) training algorithm relating to neural networks or other machine learning techniques.

The desired training algorithm can be a training algorithm that can be suitable (e.g., acceptable or optimal) for determining a trained model that can represent the respective timing path properties and operating conditions of the respective sample timing paths. For instance, employing the desired training algorithm, the DMC can map the respective items of vectorized data across respective operating conditions that can be associated with timing paths that potentially can be associated with an integrated circuit design to generate the trained model such that respective timing paths (e.g., training timing paths) of the trained model can react as they would expected to react with respect to respective properties and operating conditions. For instance, based at least in part on the mapping, a particular training timing path of the trained model can react in a same or similar manner (e.g., can have same or similar properties) under operating conditions (e.g., PVT conditions) as an actual timing path of an integrated circuit design under such operating conditions.

At block 814, the trained model can be stored in a trained database in a data store. The DMC can store the trained model, which can comprise model data that can represent the respective properties (e.g., in abstracted form) and operating conditions associated with the respective sample timing paths, in the trained database in the data store. The DMC can utilize the trained model to predict or determine other operating conditions associated with an integrated circuitry design (e.g., other operating conditions with respect to other timing paths of the integrated circuit design) based at least in part on the operating condition and the trained model, as more fully described herein.

Figure 9:
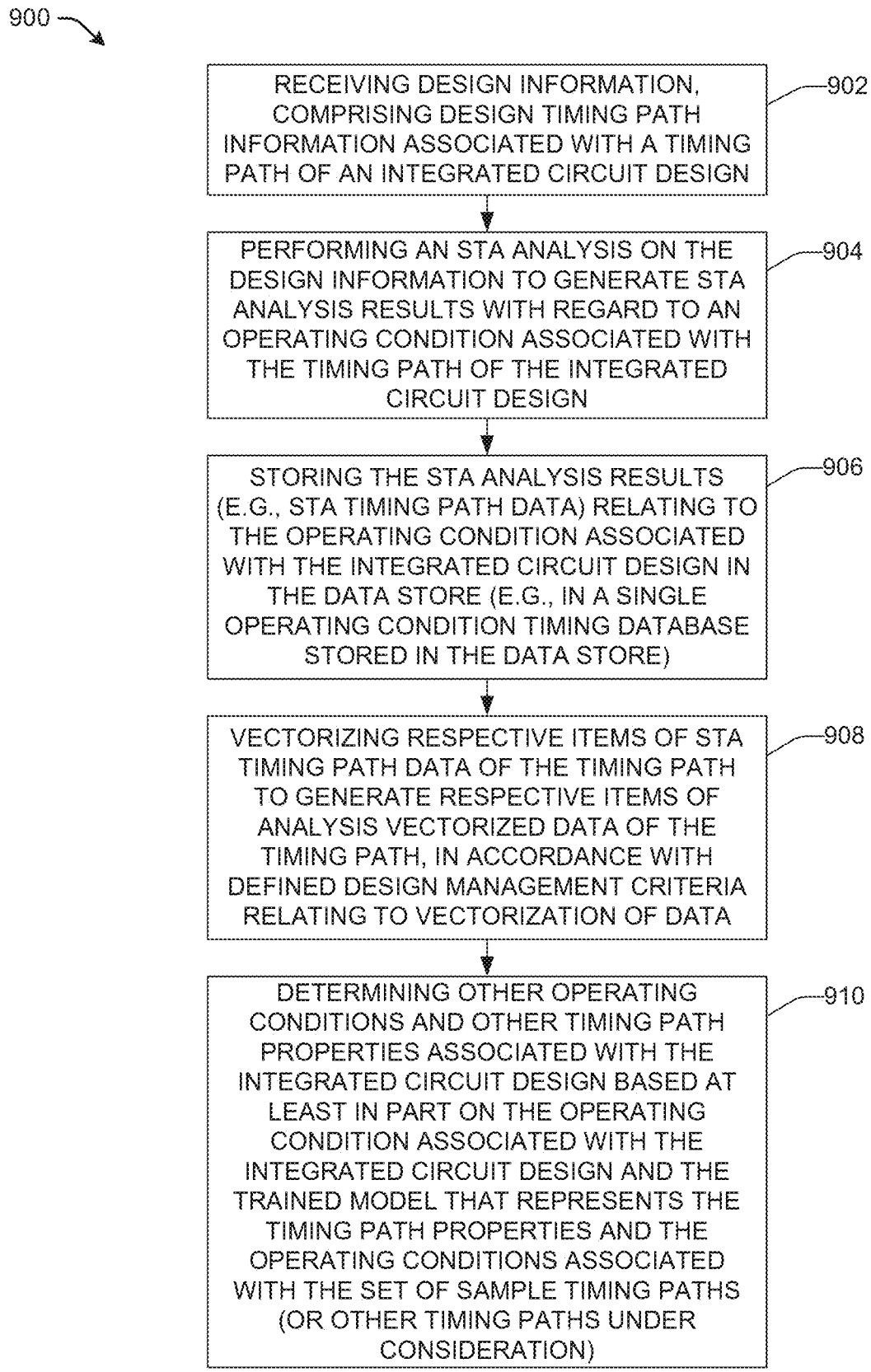
FIG. 9 depicts a flow diagram of an example method that can utilize a trained model that can desirably model or represent timing paths, including sample timing paths, to facilitate predicting the properties, operating conditions, and/or response of timing paths of an integrated circuit design, to efficiently enhance the integrated circuit design, in accordance with various aspects and embodiments of the disclosed subject matter.

FIG. 9 depicts a flow diagram of an example method 900 that can utilize a trained model that can desirably model or represent timing paths, including sample timing paths, to facilitate predicting the properties, operating conditions, and/or response of timing paths of an integrated circuit design, to efficiently enhance the integrated circuit design, in accordance with various aspects and embodiments of the disclosed subject matter. The method 900 can be implemented by a system that can comprise the DMC, a processor component, and/or a data store, for example.

At block 902, design information, comprising design timing path information associated with a timing path of an integrated circuit design, can be received. The DMC can receive the design information from a desired data source(s), which can be a user (e.g., via a user interface associated with the DMC) or a component or device of or associated with the DMC.

At block 904, an STA analysis can be performed on the design information to generate STA analysis results with regard to an operating condition associated with the timing path of the integrated circuit design. The DMC can employ an STA component that can perform the STA analysis on the design information, or a desired portion thereof, to generate the STA analysis results relating to the operating condition (e.g., a single operating condition) associated with the integrated circuit design (e.g., an operating condition associated with the timing path of the integrated circuit design). While the disclosed subject matter, including the method 900, can perform the STA analysis on a single operating condition associated with the integrated circuit design (e.g., the timing path of the integrated circuit design), as desired, in certain embodiments, the disclosed subject matter can perform the STA analysis on more than one operating condition (e.g., a relatively small number of operating conditions) associated with the integrated circuit design (e.g., one or more timing paths of the integrated circuit design).

At block 906, the STA analysis results (e.g., STA timing path data) relating to the operating condition associated with the integrated circuit design can be stored in the data store (e.g., in a single operating condition (e.g., PVT) timing database stored in the data store). In some embodiments, the DMC can store the STA analysis relating to the operating condition in the data store.

At block 908, respective items of STA timing path data of the timing path can be vectorized to generate respective items of analysis vectorized data of the timing path, in accordance with defined design management criteria relating to vectorization of data. The DMC can vectorize (e.g., perform a vectorization process on) the respective items of STA timing path data of the timing path to generate the respective items of analysis (e.g., STA) vectorized data (e.g., vectorized input data) of the timing path, in accordance with the defined design management criteria relating to vectorization of data, as more fully described herein. The vectorization of the STA timing path data can be same as or similar to the vectorization of simulation data of the sample timing paths. The DMC can determine and generate the respective items of the analysis vectorized data such that they can represent the respective items of STA timing path data of the timing path in a desired numeric form (e.g., as numeric vectors). The DMC can utilize the analysis vectorized data as vectorized input (along with vectorized data from the trained database) into the predictor component employed by the DMC to predict, derive, or determine other operating conditions and other timing path properties associated with the integrated circuit design.

At block 910, other operating conditions and other timing path properties associated with the integrated circuit design can be determined based at least in part on the operating condition associated with the integrated circuit design and the trained model that represents the timing path properties and the operating conditions associated with the set of sample timing paths (or other timing paths under consideration). The DMC, which can employ the predictor component, can determine or predict the other operating conditions and other timing path properties associated with the integrated circuit design based at least in part on the operating condition associated with the integrated circuit design and the trained model, which can represent the timing path properties and the operating conditions associated with the set of sample timing paths (or other timing paths under consideration), as more fully described herein. For instance, the DMC, employing the predictor component, can analyze the vectorized data of the trained database (e.g., vectorized data as processed during the training of the training model of the trained database) and the vectorized input data associated with the timing path of the integrated circuit design. Based at least in part on the results of analyzing the vectorized data and the vectorized input data, the DMC (e.g., the predictor component of the DMC) can determine or predict the other operating conditions and other timing path properties associated with the integrated circuit design.

Figure 10:
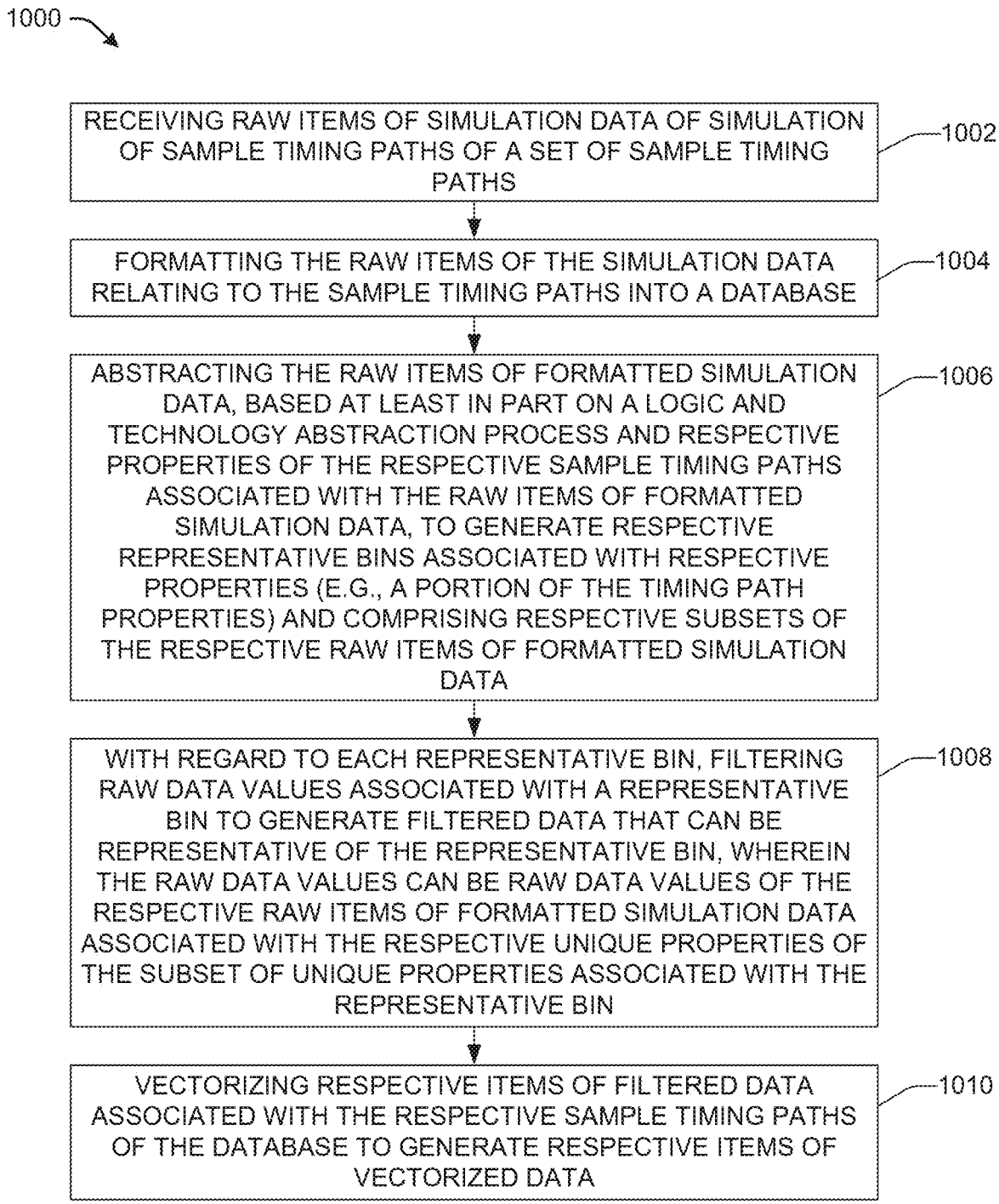
FIG. 10 illustrates a flow diagram of an example method for dataset vectorization of data to facilitate generating vectorized data (e.g., vectorized dataset) that can represent operating conditions and/or the response of timing paths of sample timing paths, to efficiently enhance the integrated circuit design, in accordance with various aspects and embodiments of the disclosed subject matter.

FIG. 10 illustrates a flow diagram of an example method 1000 for dataset vectorization of data to facilitate generating vectorized data (e.g., vectorized dataset) that can represent operating conditions and/or the response of timing paths of sample timing paths, to efficiently enhance the integrated circuit design, in accordance with various aspects and embodiments of the disclosed subject matter. The method 1000 can be implemented by a system that can comprise the DMC, a processor component, and/or a data store, for example.

At block 1002, raw items of simulation data of simulation of sample timing paths of a set of sample timing paths can be received. The DMC can receive respective raw items of the timing path information relating to the respective sample timing paths from a user or another component or device. The set of sample timing paths can comprise sample timing paths that often can be found or utilized in integrated circuits. The DMC, employing a simulator component, can perform a simulation (e.g., a spice-based simulation) of respective sample timing paths of the set of sample timing paths based at least in part on the respective raw items of the timing path information. The simulation can produce simulation results, comprising raw items of the simulation data, of the respective operating conditions and timing properties, and the respective reactions or responses of, the respective sample timing paths, wherein the DMC can receive the simulation results from its simulator component.

At block 1004, the raw items of the simulation data relating to the sample timing paths can be formatted into a database. The DMC can format the raw items of the simulation data (e.g., labeled simulation data) relating to the sample timing paths into a database, using a desired format (e.g., desired database format), in accordance with the defined design management criteria. For instance, the DMC can parse the raw items of the simulation data. Based at least in part on the results of parsing the raw items of the simulation data, the DMC can format the raw items of the simulation data to generate items of formatted simulation data, and can insert the items of the formatted simulation data into the database using and in accordance with the desired (e.g., suitable, acceptable, or preferred) database format.

At block 1006, the raw items of formatted simulation data can be abstracted, based at least in part on (e.g., using) a logic and technology abstraction process and respective properties of the respective sample timing paths associated with the raw items of formatted simulation data, to generate respective representative bins associated with respective properties (e.g., a portion of the timing path properties) and comprising respective subsets of the respective raw items of formatted simulation data. As part of performing the desired logic and technology abstraction process, the DMC can analyze the raw items of formatted simulation data, including the respective (e.g., unique or different) properties of the respective raw items of formatted simulation data. Based at least in part on the results of the analysis, the DMC can abstract the raw items of formatted simulation data to generate the respective representative bins associated with the respective properties (e.g., respective characteristics), wherein the respective representative bins can comprise or be associated with the respective subsets of the respective raw items of formatted simulation data, in accordance with the defined design management criteria relating to abstraction of data, as more fully described herein. For instance, the DMC can abstract a larger number (e.g., 1,000,000) of unique properties associated with of the sample timing paths down to a relatively smaller number (e.g., 100) of representative properties associated with the sample timing paths. The DMC can perform such data abstraction based at least in part on the respective properties, such as, for example, the respective latencies, respective slew rates, respective parasitic conditions, respective types of technologies, respective types of logic (e.g., types of logic gates), respective usage conditions, and/or respective other factors, of or associated with the respective formatted raw items of the simulation data.

A representative bin and associated representative property (e.g. representative field) of the bin can encompass or be associated with a subset of unique properties of a subset of the sample timing paths. For example, the DMC can map a subset (e.g., 30 or other number determined to be appropriate) of unique properties of a subset of sample timing paths to a representative property (e.g., representative field) that can encompass the subset of unique properties at a more abstract (e.g., less detailed) level than the more detailed level of the subset of unique properties.

At block 1008, with regard to each representative bin, raw data values associated with a representative bin can be filtered to generate filtered data that can be representative of the representative bin, wherein the raw data values can be raw data values of the respective raw items of formatted simulation data associated with the respective unique properties of the subset of unique properties associated with the representative bin. With regard to each representative bin, the DMC can filter the raw data values of the respective raw items of formatted simulation data of or associated with the representative bin, based at least in part on a desired filter, to generate the filter data associated with the representative bin, in accordance with the defined design management criteria related to filtering of raw data. The DMC, employing the desired filter, can filter the raw data values of the respective raw items of formatted simulation data of or associated with the representative bin, for example, by determining (e.g., calculating) the sum value of the raw data values, determining the mean value of the raw data values, determining the mean plus N*sigma values of the raw data values, determining the average value of the raw data values, determining the root mean square value of the raw data values, filtering out certain raw data values of certain items of the simulation data determined to be outlier data values, and/or performing other desired operations (e.g., mathematical operations) on the raw data values of the respective raw items of formatted simulation data.

At block 1010, respective items of filtered data associated with the respective sample timing paths of the database can be vectorized to generate respective items of vectorized data. The DMC can vectorize the respective items of filtered data (e.g., filtered data values) to generate the respective items of vectorized data. For example, the DMC can vectorize each of the respective items of filtered data by converting (e.g., modifying) the item of filtered data to represent the item of filtered data in the form of a numeric vector (e.g., item of vectorized data) that can correspond to that item of filtered data.

Example Computing Environment

Figure 11:
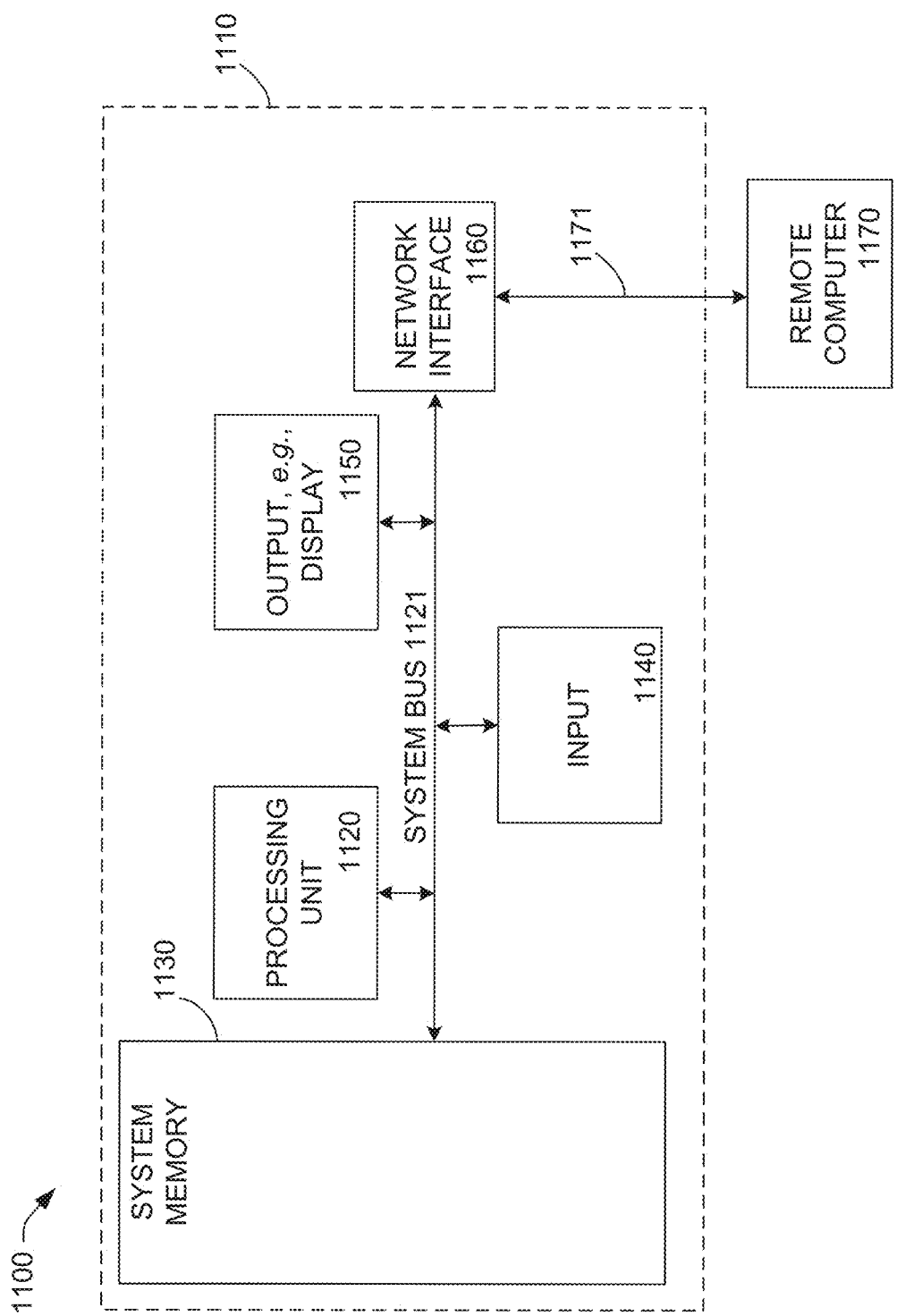
FIG. 11 illustrates a block diagram of an example electronic computing environment that can be implemented in conjunction with one or more aspects described herein.

As mentioned, advantageously, the techniques described herein can be applied to any device and/or network where analysis of data, performing an STA on an integrated circuit design, or portion thereof, to determine an operating condition(s) associated with a timing path(s) of the integrated circuit design, performing simulation on timing path data associated with sample timing paths (or other timing paths) to generate simulation results comprising simulation data, formatting the simulation data into a database comprising formatted data, abstracting respective items of formatted data associated with respective properties of a set of properties to generate respective items of abstracted data associated with respective representative properties of a set of representative properties associated with representative bins, filtering the respective items of abstracted data to generate respective items of filtered data, vectorizing the respective items of filtered data to generate respective items of vectorized data, normalizing the respective items of vectorized data to generate respective items of normalized vectorized data, training a trained database based at least in part on performing an analysis (e.g., statistical regression analysis, neural network or other machine learning analysis, . . . ) on the respective items of normalized data, or a portion thereof, predicting or determining other operating conditions associated with other timing paths of the integrated circuit design based at least in part on the trained database and the operating condition(s) associated with the timing path(s) of the integrated circuit design, and/or performing other processes or operations on data relating to the integrated circuit design can be desirable in a system comprising a device(s) or component(s) (e.g., design management component, database, trained database, processor component, data store, . . . ). It is to be understood, therefore, that handheld, portable and other computing devices and computing objects of all kinds are contemplated for use in connection with the various non-limiting embodiments, e.g., anywhere that it can be desirable for a device to be employed to facilitate generation of a design management component, database, trained database, processor component, data store, etc., for use, respectively, in the analysis of data, performing an STA on an integrated circuit design, or portion thereof, to determine an operating condition(s) associated with a timing path(s) of the integrated circuit design, performing simulation on timing path data associated with sample timing paths (or other timing paths) to generate simulation results comprising simulation data, formatting the simulation data into a database comprising formatted data, abstracting respective items of formatted data associated with respective properties of a set of properties to generate respective items of abstracted data associated with respective representative properties of a set of representative properties associated with representative bins, filtering the respective items of abstracted data to generate respective items of filtered data, vectorizing the respective items of filtered data to generate respective items of vectorized data, normalizing the respective items of vectorized data to generate respective items of normalized vectorized data, training a trained database based at least in part on performing an analysis (e.g., statistical regression analysis, neural network or other machine learning analysis, . . . ) on the respective items of normalized data, or a portion thereof, predicting or determining other operating conditions associated with other timing paths of the integrated circuit design based at least in part on the trained database and the operating condition(s) associated with the timing path(s) of the integrated circuit design, and/or performing other processes or operations on data relating to the integrated circuit design, or to be employed to comprise or be associated with a design management component, database, trained database, processor component, data store, etc., to facilitate communication of data in connection with the analysis of data, performing an STA on an integrated circuit design, or portion thereof, to determine an operating condition(s) associated with a timing path(s) of the integrated circuit design, performing simulation on timing path data associated with sample timing paths (or other timing paths) to generate simulation results comprising simulation data, formatting the simulation data into a database comprising formatted data, abstracting respective items of formatted data associated with respective properties of a set of properties to generate respective items of abstracted data associated with respective representative properties of a set of representative properties associated with representative bins, filtering the respective items of abstracted data to generate respective items of filtered data, vectorizing the respective items of filtered data to generate respective items of vectorized data, normalizing the respective items of vectorized data to generate respective items of normalized vectorized data, training a trained database based at least in part on performing an analysis (e.g., statistical regression analysis, machine learning analysis, . . . ) on the respective items of normalized data, or a portion thereof, predicting or determining other operating conditions associated with other timing paths of the integrated circuit design based at least in part on the trained database and the operating condition(s) associated with the timing path(s) of the integrated circuit design, and/or performing other processes or operations on data relating to the integrated circuit design. Accordingly, the below general purpose remote computer described below in FIG. 11 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 11 thus illustrates an example of a suitable computing system environment 1100 in which some aspects of the disclosed subject matter can be implemented, although as made clear above, the computing system environment 1100 is only one example of a suitable computing environment for a device and is not intended to suggest any limitation as to the scope of use or functionality of the disclosed subject matter. Neither should the computing environment 1100 be interpreted as having any dependency or requirement relating to any one or combination of components illustrated in the exemplary operating environment 1100.

With reference to FIG. 11, an exemplary device for implementing the disclosed subject matter includes a general-purpose computing device in the form of a computer 1110. Components of computer 1110 may include, but are not limited to, a processing unit 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures.

Computer 1110 typically includes a variety of computer readable media. Computer readable media can be any available media that can be accessed by computer 1110. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1110. Communication media typically embodies computer readable instructions, data structures, program modules, or other data in a modulated data signal such as a carrier wave or other transport mechanism and includes any information delivery media.

The system memory 1130 may include computer storage media in the form of volatile and/or nonvolatile memory such as read only memory (ROM) and/or random access memory (RAM). A basic input/output system (BIOS), containing the basic routines that help to transfer information between elements within computer 1110, such as during start-up, may be stored in memory 1130. Memory 1130 typically also contains data and/or program modules that are immediately accessible to and/or presently being operated on by processing unit 1120. By way of example, and not limitation, memory 1130 may also include an operating system, application programs, other program modules, and program data.

The computer 1110 may also include other removable/non-removable, volatile/nonvolatile computer storage media. For example, computer 1110 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 1121 through a non-removable memory interface such as an interface, and a magnetic disk drive or optical disk drive is typically connected to the system bus 1121 by a removable memory interface, such as an interface.

A user can enter commands and information into the computer 1110 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 1120 through user input 1140 and associated interface(s) that are coupled to the system bus 1121, but may be connected by other interface and bus structures, such as a parallel port, game port, or a universal serial bus (USB). A graphics subsystem can also be connected to the system bus 1121. A projection unit in a projection display device, or a HUD in a viewing device or other type of display device can also be connected to the system bus 1121 via an interface, such as output interface 1150, which may in turn communicate with video memory. In addition to a monitor, computers can also include other peripheral output devices such as speakers which can be connected through output interface 1150.

The computer 1110 can operate in a networked or distributed environment using logical connections to one or more other remote computer(s), such as remote computer 1170, which can in turn have media capabilities different from device 1110. The remote computer 1170 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 1110. The logical connections depicted in FIG. 11 include a network 1171, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 1110 can be connected to the LAN 1171 through a network interface or adapter. When used in a WAN networking environment, the computer 1110 can typically include a communications component, such as a modem, or other means for establishing communications over the WAN, such as the Internet. A communications component, such as wireless communications component, a modem and so on, which can be internal or external, can be connected to the system bus 1121 via the user input interface of input 1140, or other appropriate mechanism. In a networked environment, program modules depicted relative to the computer 1110, or portions thereof, can be stored in a remote memory storage device. It will be appreciated that the network connections shown and described are exemplary and other means of establishing a communications link between the computers can be used.

Example Networking Environment

Figure 12:
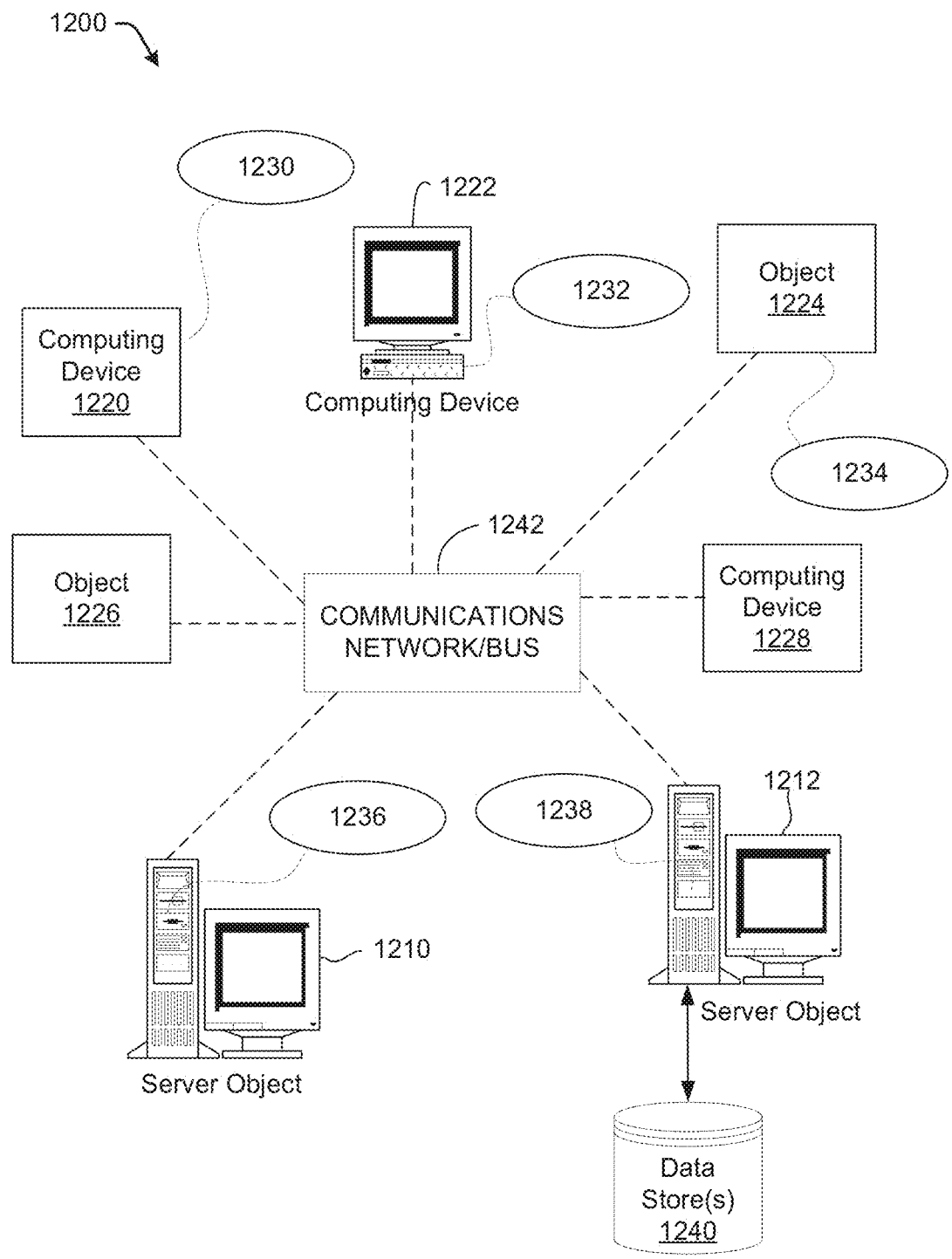
FIG. 12 depicts a block diagram of an example data communication network that can be operable in conjunction with various aspects described herein.

FIG. 12 provides a schematic diagram of an exemplary networked or distributed computing environment 1200. The distributed computing environment comprises computing objects 1210, 1212, etc. and computing objects or devices 1220, 1222, 1224, 1226, 1228, etc., which may include programs, methods, data stores, programmable logic, etc., as represented by applications 1230, 1232, 1234, 1236, 1238 and data store(s) 1240. It can be appreciated that computing objects 1210, 1212, etc. and computing objects or devices 1220, 1222, 1224, 1226, 1228, etc. may comprise different devices, including a multimedia display device or similar devices depicted within the illustrations, or other devices such as a mobile phone, personal digital assistant (PDA), audio/video device, MP3 players, personal computer, laptop, etc. It should be further appreciated that data store(s) 1240 can include one or more cache memories, one or more registers, or other similar data stores disclosed herein.

Each computing object 1210, 1212, etc. and computing objects or devices 1220, 1222, 1224, 1226, 1228, etc. can communicate with one or more other computing objects 1210, 1212, etc. and computing objects or devices 1220, 1222, 1224, 1226, 1228, etc. by way of the communications network 1242, either directly or indirectly. Even though illustrated as a single element in FIG. 12, communications network 1242 may comprise other computing objects and computing devices that provide services to the system of FIG. 12, and/or may represent multiple interconnected networks, which are not shown. Each computing object 1210, 1212, etc. or computing object or devices 1220, 1222, 1224, 1226, 1228, etc. can also contain an application, such as applications 1230, 1232, 1234, 1236, 1238, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 12, as a non-limiting example, computing objects or devices 1220, 1222, 1224, 1226, 1228, etc. can be thought of as clients and computing objects 1210, 1212, etc. can be thought of as servers where computing objects 1210, 1212, etc., acting as servers provide data services, such as receiving data from client computing objects or devices 1220, 1222, 1224, 1226, 1228, etc., storing of data, processing of data, transmitting data to client computing objects or devices 1220, 1222, 1224, 1226, 1228, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1242 or bus is the Internet, for example, the computing objects 1210, 1212, etc. can be Web servers with which other computing objects or devices 1220, 1222, 1224, 1226, 1228, etc. communicate via any of a number of known protocols, such as the hypertext transfer protocol (HTTP). Computing objects 1210, 1212, etc. acting as servers may also serve as clients, e.g., computing objects or devices 1220, 1222, 1224, 1226, 1228, etc., as may be characteristic of a distributed computing environment.

Reference throughout this specification to "one embodiment," "an embodiment," "an example," "an implementation," "a disclosed aspect," or "an aspect" means that a particular feature, structure, or characteristic described in connection with the embodiment, implementation, or aspect is included in at least one embodiment, implementation, or aspect of the present disclosure. Thus, the appearances of the phrase "in one embodiment," "in one example," "in one aspect," "in an implementation," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "architecture," "engine" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the disclosed subject matter. It is, of course, not possible to describe every conceivable combination of components or methodologies for purposes of describing the disclosed subject matter, but one of ordinary skill in the art can recognize that many further combinations and permutations of the disclosed subject matter are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A system for determining timing path frequency associated with an integrated circuitry design, comprising:
a memory that stores executable components and a trained model that represents timing path properties and operating conditions; and
a processor, operatively coupled to the memory, that executes the executable components, the executable components comprising:
a design management component that determines a trained model that models timing path properties and operating conditions of a set of agnostic timing paths based at least in part on an analysis of vectorized data that represents timing path information associated with the set of agnostic timing paths; and
a static timing analysis component that performs a static timing analysis on design information associated with the integrated circuitry design and determines an operating condition of a timing path of the integrated circuitry design based at least in part on the static timing analysis, wherein the design management component determines at least one other operating condition associated with the integrated circuitry design based at least in part on the operating condition and the trained model that models the timing path properties and the operating conditions of the set of agnostic timing paths; and the design management component normalizes the vectorized data to generate normalized vectorized data that represents the timing path information associated with the set of agnostic timing paths, and divides the normalized vectorized data into a first portion of the normalized vectorized data that is a set of training data and a second portion of the normalized vectorized data that is a set of validation data.

2. The system of claim 1, wherein the design management component performs a defined analysis on the set of training data to generate training results, determines whether the training results are validated based at least in part on the validation data and a defined design management criterion, and, in response to validating the training results, determines the trained model that models the timing path properties and the operating conditions of the set of agnostic timing paths based at least in part on the set of training data, and wherein the design management component performs the defined analysis on the set of training data using a defined training algorithm relating to statistical regression or a neural network.

3. The system of claim 1, further comprising a simulator component that simulates respective agnostic timing paths of the set of agnostic timing paths across the timing path properties and the operating conditions, based at least in part on respective portions of the timing path information associated with the respective agnostic timing paths, to generate respective items of simulation data associated with the respective agnostic timing paths.

4. The system of claim 3, wherein the design management component formats the respective items of the simulation data associated with the respective agnostic timing paths into a database to generate respective items of formatted data, abstracts the respective items of formatted data to generate respective items of abstracted data, and filters the respective items of abstracted data to generate respective items of filtered data, to facilitate generation of the vectorized data.

5. The system of claim 4, wherein the design management component abstracts the respective items of formatted data associated with respective properties of a set of properties to generate the respective items of abstracted data associated with respective representative properties of a set of representative properties associated with a set of representative bins, and wherein a first number of the respective properties of the set of properties is larger than a second number of the respective representative properties of the set of representative properties.

6. The system of claim 4, wherein, in connection with the simulation of the respective agnostic timing paths, the simulator component performs spice path vectorization to facilitate conversion of the respective items of the simulation data to facilitate the generation of the vectorized data.

7. The system of claim 1, wherein the vectorized data represents the timing path properties and the operating conditions of the respective agnostic timing paths as respective numerical vectors.

8. The system of claim 1, wherein the operating conditions comprise process-voltage-temperature conditions, and wherein the operation condition comprises a process-voltage-temperature condition.

9. The system of claim 1, wherein the design management component stores model data of the trained model in a trained database, and wherein the model data represents the timing path properties and the operating conditions of the set of agnostic timing paths.

10. The system of claim 1, wherein the design management component generates analysis timing path data associated with the timing path of the integrated circuitry design, based at least in part on the static timing analysis, and converts the analysis timing path data to facilitate generation of vectorized input data that represents the analysis timing path data as a numerical vector.

11. The system of claim 10, wherein the design management component predicts the at least one other operating condition associated with at least one other timing path of the integrated circuitry design based at least in part on the vectorized input data associated with the operating condition and the trained model that models the timing path properties and the operating conditions of the set of agnostic timing paths.

12. The system of claim 1, wherein the at least one other operating condition comprises a set of operating conditions associated with the integrated circuitry design, wherein the set of operating conditions comprise multiple operating conditions associated with multiple timing paths of the integrated circuitry design, and wherein the design management component determines analysis vectorized data associated with the multiple timing paths, based at least in part on the static timing analysis, and performs vectorization density analysis on the analysis vectorized data to filter out a first portion of the analysis vectorized data that comprise repetitive items of the analysis vectorized data, in accordance with a defined design management criterion, to facilitate generating a second portion of the analysis vectorized data to include in the vectorized data.

13. A method for determining timing path frequency associated with an integrated circuitry design, comprising:

determining, by a system comprising a processor, a trained model that represents timing path properties and operating conditions of a set of sample timing paths based at least in part on an analysis of vectorized information determined from timing path information associated with the set of sample timing paths;

determining, by the system, an operating condition of a timing path of the integrated circuitry design based at least in part on a static timing analysis performed on design data associated with the integrated circuitry design;

determining, by the system, at least one other operating condition associated with the integrated circuitry design based at least in part on the operating condition and the trained model that represents the timing path properties and the operating conditions of the set of sample timing paths;

normalizing, by the system, the vectorized information to generate normalized vectorized information that represents the timing path information associated with the set of sample timing paths; and allocating, by the system, the normalized vectorized information into a first portion of the normalized vectorized information that is a set of training information and a second portion of the normalized vectorized information that is a set of validation information.

14. The method of claim 13, further comprising:
generating, by the system, training results based at least in part on a defined analysis performed on the set of training information, wherein the defined analysis is performed on the set of training information using a defined training algorithm relating to statistical regression or a neural network;
determining, by the system, whether the training results are valid based at least in part on the validation information and a defined design management criterion; and
one of:
  in response to determining that the training results are valid, determining, by the system, the trained model that represents the timing path properties and the operating conditions of the set of sample timing paths based at least in part on the set of training information, or
  in response to determining that the training results are not valid, modifying, by the system, a training parameter associated with training the trained model that represents the timing path properties and the operating conditions of the set of sample timing paths to facilitate the determining of the trained model.

15. The method of claim 13, further comprising:
simulating, by the system, respective sample timing paths of the set of sample timing paths with regard to the timing path properties and the operating conditions, based at least in part on respective portions of the timing path information associated with the respective sample timing paths, to generate respective items of simulation information associated with the respective sample timing paths.

16. The method of claim 15, further comprising:
converting, by the system, the respective items of the simulation information associated with the respective sample timing paths to facilitate generating the vectorized information, wherein the vectorized information represents the timing path properties and the operating conditions of the respective sample timing paths as respective numerical vectors.

17. The method of claim 16, further comprising:
in connection with the simulating of the respective sample timing paths, performing, by the system, spice path vectorization to facilitate the converting of the respective items of the simulation information to generate the vectorized information.

18. The method of claim 13, further comprising:
storing, by the system, model information of the trained model in a trained database, wherein the model information represents the timing path properties and the operating conditions of the set of sample timing paths.

19. The method of claim 13, further comprising:
generating, by the system, analysis information associated with the timing path of the integrated circuitry design, based at least in part on the static timing analysis;
converting, by the system, the analysis information to generate vectorized input information that represents the analysis information as a numerical vector; and
predicting, by the system, the at least one other operating condition associated with at least one other timing path of the integrated circuitry design based at least in part on the vectorized input information associated with the operating condition and the trained model that represents the timing path properties and the operating conditions of the set of sample timing paths.

20. The method of claim 13, wherein the at least one other operating condition comprises a set of operating conditions associated with the integrated circuitry design, wherein the set of operating conditions comprise multiple operating conditions associated with multiple timing paths of the integrated circuitry design, and wherein the method further comprises:
determining, by the system, analysis vectorized information associated with the multiple timing paths, based at least in part on the static timing analysis; and
performing, by the system, vectorization density analysis on the analysis vectorized information to filter out a first portion of the analysis vectorized information that comprises repetitive items of the analysis vectorized information, in accordance with a defined design management criterion, to facilitate generating a second portion of the analysis vectorized information to include in the vectorized information.

21. A machine-readable storage medium, comprising executable instructions that, when executed by a processor, facilitate performance of operations, comprising:
generating a trained model that represents timing path properties and operating conditions of a set of sample timing paths based at least in part on an analysis of vectorized data determined from timing path information associated with the set of sample timing paths;
determining an operating condition of a timing path of a design of integrated circuitry based at least in part on a static timing analysis performed on design data associated with the design of the integrated circuitry;
predicting at least one other operating condition associated with the design of the integrated circuitry based at least in part on the operating condition and the trained model that represents the timing path properties and the operating conditions of the set of sample timing paths;
normalizing the vectorized data to generate normalized vectorized data that represents the timing path information associated with the set of sample timing paths; and
apportioning the normalized vectorized data into a first portion of the normalized vectorized data that is a set of training information and a second portion of the normalized vectorized data that is a set of validation data.

22. The machine-readable storage medium of claim 21, wherein the operations further comprise:
performing a defined analysis on the set of training data to generate training results, wherein the defined analysis is performed on the set of training data using a defined training algorithm relating to statistical regression or a neural network;
determining whether the training results are valid based at least in part on the validation data and a defined design management criterion; and
in response to determining that the training results are valid, determining the trained model that represents the timing path properties and the operating conditions of the set of sample timing paths based at least in part on the set of training data.

* * * * *